(12) United States Patent
Chu

(10) Patent No.: US 8,533,076 B2
(45) Date of Patent: *Sep. 10, 2013

(54) ONLINE GAME COMMERCE SYSTEM

(75) Inventor: Viva Chu, San Leandro, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/308,474

(22) Filed: Nov. 30, 2011

(65) Prior Publication Data

US 2013/0095910 A1    Apr. 18, 2013

Related U.S. Application Data

(63) Continuation of application No. 10/317,371, filed on Dec. 2, 2002.

(51) Int. Cl.
*G07B 17/00* (2006.01)
*G06F 17/00* (2006.01)

(52) U.S. Cl.
USPC .......................... 705/30; 713/179

(58) Field of Classification Search
USPC .................................................... 705/30
See application file for complete search history.

(56) References Cited

U.S. PATENT DOCUMENTS

| | | | |
|---|---|---|---|
| 6,754,823 B1* | 6/2004 | Kurzweil et al. | 713/179 |
| 8,090,618 B1 | 1/2012 | Chu | |
| 2001/0000709 A1* | 5/2001 | Takahashi et al. | 380/277 |
| 2003/0101092 A1* | 5/2003 | Fuller et al. | 705/14 |
| 2003/0143952 A1* | 7/2003 | Haller et al. | 455/41 |
| 2005/0187873 A1* | 8/2005 | Labrou et al. | 705/40 |

OTHER PUBLICATIONS

U.S. Appl. No. 10/317,371, filed Dec. 12, 2002, Chu.

* cited by examiner

*Primary Examiner* — Garcia Ade
(74) *Attorney, Agent, or Firm* — Perkins Coie LLP

(57) ABSTRACT

An online game commerce system, in one embodiment, provides an architecture for enabling the interactive trade, collection, advertisement, purchase, and sales of video game components through the representation and use of an online marketplace such as an auction, store, trading hub or similar expression within a video game. For example, an online race car game purchased at a retail store comes with five different starter cars, but game players are offered the opportunity through an online store or auction accessible through the game to purchase additional cars for $5 each or a new engine for existing cars for $1.00 each. After the initial release of the game, game publishers may offer new cars and race tracks downloadable online for a price of $5.00 each or a promotional offer of $20 for any combination of five.

20 Claims, 30 Drawing Sheets

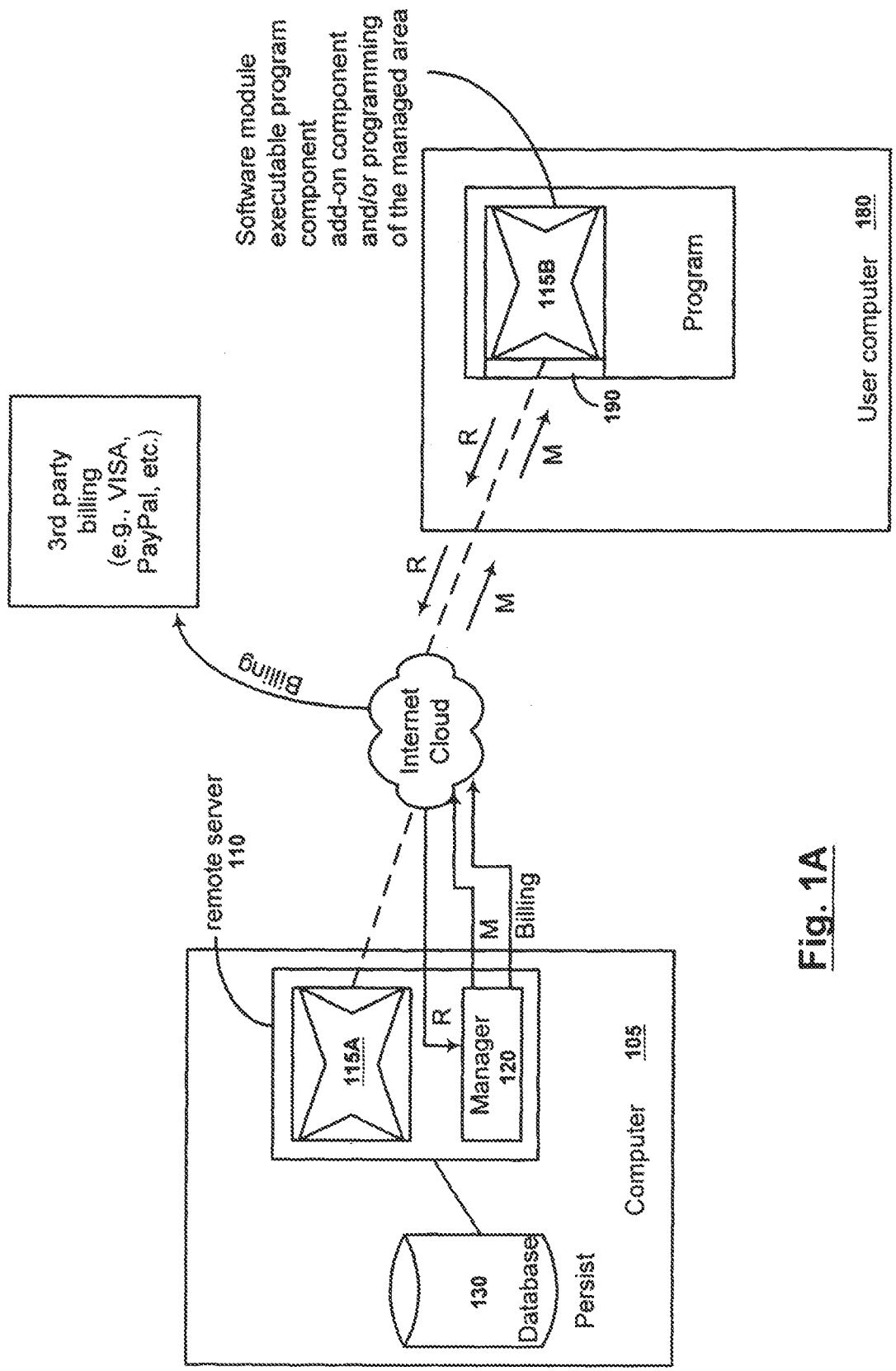

```xml
<?xml version="1.0" encoding="UTF-8"?>
<ItemListing xmlns:xsi="http://www.w3.org/2001/XMLSchema-instance" xsi:noNamespaceSchemaLocation="ItemListing.xsd" totalCount="2" startIndex="0" pageCount="2" totalPrice="6.00" totalPoints="600">
    <AuctionItem>
        <ID>2147483647</ID>
        <Name>Shot gun tommy</Name>
        <Description>Automatic shot gun with a cartridge that resembles that of a tommy gun.</Description>
        <Edition>Double Barrel</Edition>
        <Level>5</Level>
        <Points>300</Points>
        <GameComponent>
            <ID>0</ID>
            <Name>Shot gun tommy</Name>
            <Type>Machine Gun</Type>
            <Description>Automatic shot gun with a cartridge that resembles that of a tommy gun.</Description>
            <LocalFiles>1</LocalFiles>
            <Thumbnail>/commerce/thumbnails/0.jpg</Thumbnail>
            <Profile>/commerce/profiles/0.jpg</Profile>
        </GameComponent>
        <StartingBid>1.00</StartingBid>
        <CurrentBid>1.50</CurrentBid>
        <BidIncrement>.50</BidIncrement>
        <StartDate>2002-10-11T08:00:00</StartDate>
        <TimeLeft>120093</TimeLeft>
        <HighestBidder>roadkill</HighestBidder>
        <Inventory>
            <Control>fixed</Control>
            <InitialStock>2500</InitialStock>
            <InStock>1000</InStock>
        </Inventory>
    </AuctionItem>
    <AuctionItem>
        <ID>2147483648</ID>
        <Name>Z-2393 Laser</Name>
        <Description>Adjustable laser beam circumference from 10 to 500 centimeters..</Description>
        <Edition>Limited</Edition>
        <Level>2</Level>
        <Points>500</Points>
        <GameComponent>
            <ID>1</ID>
            <Name>Z-2393</Name>
            <Type>Laser rifle</Type>
            <Description>Adjustable laser beam circumference from 10 to 500 centimeters.</Description>
            <LocalFiles>1</LocalFiles>
            <Thumbnail>/commerce/thumbnails/1.jpg</Thumbnail>
            <Profile>/commerce/profiles/1.jpg</Profile>
        </GameComponent>
        <StartingBid>1.00</StartingBid>
        <CurrentBid>10.00</CurrentBid>
        <BidIncrement>1.00</BidIncrement>
        <StartDate>2002-10-11T08:00:00</StartDate>
        <TimeLeft>120093</TimeLeft>
        <HighestBidder>roadkill</HighestBidder>
        <Inventory>
            <Control>date</Control>
            <StartDate>2002-10-11T08:00:00</StartDate>
            <EndDate>2002-10-30T08:00:00</EndDate>
        </Inventory>
    </AuctionItem>
</ItemListing>
```

(300) — header / root declaration
(310) — AuctionItem attributes
(320) — GameComponent block
(330) — Bidding information
(340) — Inventory block

Fig. 6

Game Components

Game Components
All – A B C D E F G H I J K L M N O P Q R S T U V W X Y Z  Showing: 1-4 of 200 | First | Prev | Next | Last

[ New ]  [ Delete ]

| ☐ | Name | Edition | Type | Description | Thumbnail |
|---|---|---|---|---|---|
| ☐ | Jake Baton | 3rd | Character | 1st lieutenant of 33rd battalion of green berets. | jakebaton.mov |
| ☐ | M-16 | 1st | Weapon | Fully automatic, standard issue | m-16.gif |
| ☐ | Rocket Launcher | 1st | Weapon | Take out helicopters at short ranges | rlauncher.jpg |
| ☐ | Snake bite kit | 2nd | Equipment | Comes in handy when in rough mountain terrain. | snakebitekit.gif |

Game Components

New/Edit Game Component

[ Save ]  [ Cancel ]

Component Profile

| Component ID: | | |
|---|---|---|
| Name: | | |
| Type: | | |
| Description: | | |
| Dimensions: | Width  Height  Depth | Pixels |
| Thumbnail Media File: | thumbNail.gif (5 K) | [ Upload New File ... ] |
| Profile Media File: | profile.mov (200 K) | [ Upload New File ... ] |
| Retrieve Component Binary: | From game disk ▼ | From game disk ▼ / From Server |
| Component Binary Path on Disc: | | |
| Component Binary: | component.zip (5.4 MB) | [ Upload New File ... ] |

Default Valuation

| Edition: | 1st |
|---|---|
| Level: | 0 |
| Points: | 0 |
| Price: | $ |

Stores

New Store
Store Settings
Categories [add]

Store Settings

[Save] [Cancel]

General Information

| Store ID: | |
| Description: | |
| Location: | Downtown Planet Esbula ▼ |

Account Information

| Account Holder Name: | First / Middle / Last |
| Account Holder Address: | Street / City / State / Zip/Postal / Country |
| Account Information: | Merchant Identification Number (MID) / Terminal Identification Number (TID) |
| Accepted Payment: | ☐ MasterCard ☐ Visa ☐ Discover ☐ American Express ☐ Game Points ☐ Game Item Marker |

Customer Service

| Refund Policy: | No refunds ▼ | No refunds ▼ |
| Contact: | Phone Number / Email Address | 30 days / 10 days / 5 days / 3 days / Any time |

Stores

Vehicle Outlet

Store Settings
Categories [add]
Jeeps
Sports Cars
Trucks

Show if Inventory Control is Fixed
Show if Inventory Control is Limited by Date

Store Settings

[Save] [Cancel]

Item Profile

| Item Name | |
| --- | --- |
| Game Component: | BMW 2002 M-Series ▼ |
| Description: | |

Valuation

| Edition: | Red Limited |
| --- | --- |
| Level: | M5 |
| Points: | 0 |
| Price: | $6 |

Inventory

| Items Sold: | 12 | | |
| --- | --- | --- | --- |
| Inventory Control: | Unlimited ▼ | | Unlimited ▼ |
| Items in Stock: (Fixed) | Initial Number | Current Number | Fixed<br>Limited by date |
| Sales Dates: (Limited by Date) | Start Date (mm/dd/yyyy) | End Date (mm/dd/yyyy) | |

*FIG. 12*

Auctions

Auctions

| New | Delete | | |
|---|---|---|---|
| ☐ | Auction ID | Name | Description |
| ☐ | characters | Vixens and Vikings | Hot babes who whup ass! |
| ☐ | equipment | Gadgets Galore | The latest spy gadgets |
| ☐ | vehicles | Vehicle Outlet | Cars and trucks |
| ☐ | weapons | Shoot em up | Military grade weapons |

Auctions

New Auction
Auction Settings
Categories [add]

Auction Settings

Save | Cancel

General Information

| Auction ID: | |
|---|---|
| Description: | |
| Location: | Downtown Planet Esbula ▼ |

Account Information

| Account Holder Name: | First | Middle | Last |
|---|---|---|---|
| Account Holder Address: | Street | | |
| | City | State | Zip/Postal | Country |
| Account Information: | Merchant Identification Number (MID) | Terminal Identification Number (TID) | |
| Accepted Payment: | ☐ MasterCard ☐ Visa ☐ Discover ☐ American Express ☐ Game Points ☐ Game Item Marker | | |

Customer Service

| Refund Policy: | No refunds ▼ | No refunds ▼ |
|---|---|---|
| Contact: | Phone Number   Email Address | 30 days<br>10 days<br>5 days<br>3 days<br>Any time |

Auctions

Vehicle Outlet

Store Settings
Categories [add]
Jeeps
Sports Cars
Trucks

Show if Inventory Control is Fixed
Show if Inventory Control is Limited by Date

New/Edit Item

[Save] [Cancel]

Item Profile

| | |
|---|---|
| Item Name | |
| Game Component: | BMW 2002 M-Series ▼ |
| Description: | |

Valuation

| | |
|---|---|
| Edition: | Red Limited |
| Level: | M5 |
| Points: | 0 |

Auction

| | | |
|---|---|---|
| Bid Price: | $6 | $12 |
| | Starting Bid | Current bid <username> |
| Bid Increments: | $1 | |
| End Auction: | 3 days from start | 10/15/2002 |

Inventory

| | | | |
|---|---|---|---|
| Items Sold: | 12 | | |
| Inventory Control: | Unlimited ▼ | | Unlimited ▼ |
| Items in Stock: | | | Fixed |
| | Initial Number | Current Number | Limited by date |
| Sales Dates: | | | |
| | Start Date (mm/dd/yyyy) | End Date (mm/dd/yyyy) | |

Checkout

| | | | | |
|---|---|---|---|---|
| Audi TT Coupe | Year: 2002<br>Color: Silver<br>Miles: 2,230 | Speed: 225 hp<br>Acceleration: 80<br>Safety: 10 | | $3.50 |
| BMW M5 | Year: 2001<br>Color: Steel Blue<br>Miles: 10,300 | Speed: 210 hp<br>Acceleration: 55<br>Safety: 70 | | $2.50 |

Total: $6.00

Charge to:
Mastercard XXXX XXXX XXXX 1235 04/02

(X) Confirm Purchase  (□) View cart  (△) Back  (○) Cancel

---

Thank you for your purchase!

| | | | | |
|---|---|---|---|---|
| Audi TT Coupe | Year: 2002<br>Color: Silver<br>Miles: 2,230 | Speed: 225 hp<br>Acceleration: 80<br>Safety: 10 | | $3.50 |
| BMW M5 | Year: 2001<br>Color: Steel Blue<br>Miles: 10,300 | Speed: 210 hp<br>Acceleration: 55<br>Safety: 70 | | $2.50 |

Total: $6.00

Charged to:
Mastercard XXXX XXXX XXXX 1235 04/02

(X) Go back to your game

Game Players

Game Players
All–ABCDEFGHIJKLMNOPQRSTUVWXYZ   Showing: 1-4 of 200 | First | Prev | Next | Last

| | Game Player ID | Name | Phone Number | Email Address |
|---|---|---|---|---|
| ☐ | machoman | Randy Travis | 510-123-5685 | randy@country.com |
| ☐ | heman | Lili Tomlin | 615-656-5685 | ltomlin@earthlink.com |
| ☐ | shogun | Jennifer Connely | 566-859-5563 | jconn@uconn.edu |
| ☐ | whuppinbutt | George Bush | 555-555-7568 | pres@us.gov |

[New] [Delete]

Confirmation
Are you sure you want to delete the selected game players? Doing so will permanently remove them from the system.
[Yes] [Cancel]

Game Players

New/Edit Game Player
[Save] [Cancel]

Identification

| Game Player ID: | |
| Password: | |
| Confirm Password: | |
| Name: | First / Middle / Last |

Contact Information

| Home Address: | Street / City / State / Zip/Postal / Country |
| Phone Numbers: | Home / Work / Mobile |
| Email Address: | |

Billing Information

| Billing Address: | ☐ Use Home Address / Street / City / State / Zip/Postal / Country |
| Credit Card Information: | Mastercard ▼ / Card Type / Account Number / Expiration (mm/yyyy) |

*FIG. 24*

Create/Edit Game Player Account

| Identification | |
|---|---|
| Game Player ID*: | [                    ] ⇐ C D E F [G] H I J K L ⇒ |
| Password*: | [                    ] |
| Confirm Password*: | [                    ] |
| First Name*: | [                    ] |
| Middle Name: | [                    ] |
| Last Name*: | [                    ] |

(X) Select   (□) Next   (△) Back   (○) Cancel

Create/Edit Game Player Account

| Contact Information: | |
|---|---|
| Email Address*: | [                    ] ⇐ C D E F [G] H I J K L ⇒ |
| Home Phone: | [                    ] |
| Street Address Line 1: | [                    ] |
| Street Address Line 2: | [                    ] |
| City: | [                    ] |
| State: | [                    ] |
| Zip/Postal Code: | [                    ] |
| Country: | [                    ] |

(X) Select   (□) Next   (△) Back   (○) Cancel

Fig. 26

Create/Edit Game Player Account

| Credit Card Information | |
|---|---|
| Credit Card Type*: | ⇐ Mastercard ⇒ |
| Account Number*: | [_____] ⇐ C D E F [G] H I J K L ⇒ |
| Expiration Date (mm/dd/yyyy)*: | [_____] |
| Name on Card*: | [_____] |
| Billing Address*: | ⇐ Same as home ⇒ |
| Street Address 1*: | [_____] |
| Street Address 2*: | [_____] |
| City*: | [_____] |
| State*: | [_____] |
| Zip/Postal Code*: | [_____] |
| Country*: | [_____] |

(X) Select    (□) Finish    (△) Back    (○) Cancel

---

Game Player Account

Congratulations you have successfully created/edited your game player account.

Game Player ID: rasputin (X) Resume Game

Fig. 27

ONLINE GAME COMMERCE SYSTEM

CROSS REFERENCE TO RELATED APPLICATION

This application is a continuation application of U.S. patent application Ser. No. 10/317,371, filed on Dec. 12, 2002, now U.S. Pat. No. 8,090,618 issued Jan. 3, 2012, which is incorporated herein in its entirety by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to an online game commerce system, which in one embodiment serves as an architecture for enabling the interactive trade, collection, advertisement, purchase, cataloging, and sales of video game components through the representation and use of an online marketplace such as an auction, store, trading hub or similar expression within a video game.

BACKGROUND

Traditional video game play has been typically viewed as an individual experience in which game players may immerse themselves interactively against the characters, scenery, and challenges presented by the game itself. Interactive play with real people opponents and teammates occurs within the boundaries of one's living room or immediate environment from where game players may share the same physical game system and accessories needed to play with each other.

Although with traditional offline games, playing with real people is limited by one's physical environment and game system, indirect interaction about the game does occur within a larger social and cultural setting outside the immediate context of game play. Just as people discuss the latest episode of ER or news and magazine article headlines, game players discuss and share the challenges and enjoyment that they experience while playing a game. Moreover, although game players may not be directly competing with each other physically, they may do so indirectly by sharing, discussing, and bragging about their achievements after playing alone.

Another aspect of traditional video game play is the ability of game players to save the state of their game on a memory card or hard drive of the game system on which they are playing. Specifically, game players may save the objects, weapons, characters, and components that one has collected, the location, level, or stage that one has achieved, and the total points, health, or ranking that one has acquired during the course of a game or set of successive game plays. The ability and desire of game players to save the state of their games is indicative of an inherent value system placed upon the components, actions, and accomplishments achieved during game play.

This value system may be subjective to an individual's own time investment and interests with a game, but, may also be relatively compared to the overall time investment and interests of the larger game community of players who have achieved the same or similar achievements by playing the same game. When considering the value of the different aspects of game state and game achievements within the larger context of a gaming community of players, the context and interactivity of a video game begins to transcend the physical boundaries of the game itself into a social, cultural, and economic discourse and exchange of similar interests and experiences.

A business aspect of traditional offline video games is that game publishers generate revenues through the unit sales of games on the wholesale market. As the video games must be manufactured onto CDs or DVDs and packaged and distributed physically by distributors and retailers, the mark-up of a game by the time it reaches the end consumer usually is twice the amount of the wholesale price. Moreover, the physical distribution requirements of an offline game limits game production and development to a holistic approach whereby game characters, levels, actions, components, and "bug" fixes must be introduced according to one overall release schedule.

With the development of the Internet and online games, video game players may play against and with each other directly and are no longer bounded by the physical constraints of their location or game system. For example, game players playing on a personal computer with access to the Internet may race each other when playing a race car game or team up with each other when playing a role playing fantasy game. All players in this scenario may be located in different locations so long as their personal computer is running the same version of the game being played and is connected to the Internet.

What is most compelling about online games is that the social, cultural, and economic interaction that typically occur outside the immediate context of a traditional offline game may now occur within the game itself thereby becoming part of the overall gaming experience. Specifically the game components, levels, and achievements of a player may now be directly discussed, traded, advertised, sold, and purchased as part of the game itself according to the larger marketplace dynamics of the overall value system of the larger online gaming community.

Lastly with online games, the possibility for game publishers to forego the manufacturing and distribution costs of releasing a physical CD exists. Using the Internet as a distribution mechanism, game publishers may sell and distribute their games to consumers directly. Moreover, the flexibility of online distribution also allows game publishers to release games in a more granular fashion thereby staging their overall release schedules into several mini releases and/or more finely pricing game characters, levels, actions and components into individual product offerings or groupings.

SUMMARY

The present inventors have realized the need to provide dynamic updates and real time management of various parts of programs in general and gaming systems in particular. In one embodiment, the present invention provides a game, comprising, a game playing program wherein at least one part of the game playing program is configured to be populated with an add-on component. The invention may also be practiced as a system, comprising, a game playing program wherein at least one part of the game playing program is configured to be populated with an add-on component, a remote server configured to store and serve at least one add-on component compatible with the game playing program, and an interface coupled to the game playing program, the interface configured to interact with the remote server and facilitate importation of an add-on component from the remote server into said at least one part of the game playing program.

In another embodiment, the invention is a server configured to manage an area within a program hosted on a user computer, wherein the server is remotely located from the user computer.

The invention may also be practiced as one or more methods, for example, a method of on-line commerce, comprising the steps of, registering a user of a gaming system, uploading an add-on component to a game program of the registered user, wherein the game program is configured to accept and install the add-on component, and managing activities of the user during interactions of the user with the uploaded add-on component. As another example, the invention is a method of producing add-on components for games, comprising the steps of, preparing an executable program component capable of being imported into a game program and configured to interact with a game being played by a user of the game program.

In yet other embodiments, the invention is a component comprising, a software module configured to be imported into a commercially available gaming program, wherein said software module is configured to implement an additional feature of the gaming program, the additional feature comprising at least one of a sales component, on-line store, auction, equipment, characters, scenes, levels, weapons, strategies, actions, rooms, text, graphics, video, and objects used by the game program.

These and other embodiments and features of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a block diagram of a gaming system according to an embodiment of the present invention;

FIG. 6 is a printout example of a 6 XML code of a game item auction listing according to an embodiment of the present invention;

FIG. 8 is a screenshot example of using the Game Manager Management Console for registering game components according to an embodiment of the present invention;

FIG. 9 is a screenshot example of using the Game Manager Management Console to register game locations according to an embodiment of the present invention;

FIG. 10 is a screenshot example of how a store using the Commerce Manager Management Console is defined according to an embodiment of the present invention;

Figure 11:
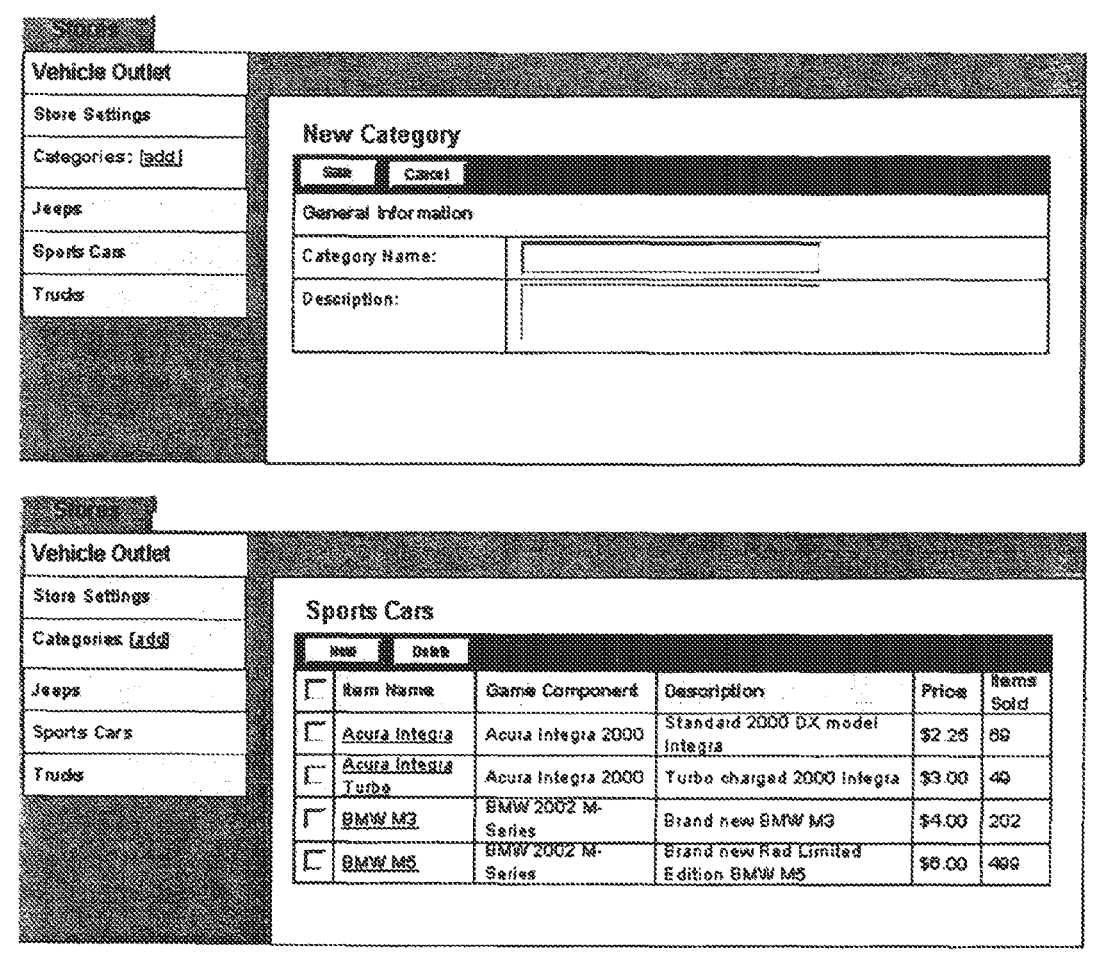

FIG. 11 is a screenshot example of how a store catalog inventory is defined using the Commerce Manager Management Console according to an embodiment of the present invention;

FIG. 12 is a screenshot example of how provisioning rules for a store game item is defined using the Commerce Manager Management Console according to an embodiment of the present invention;

FIG. 13 is a screenshot example of how an auction is defined using the Commerce Manager Management Console according to an embodiment of the present invention;

Figure 14:
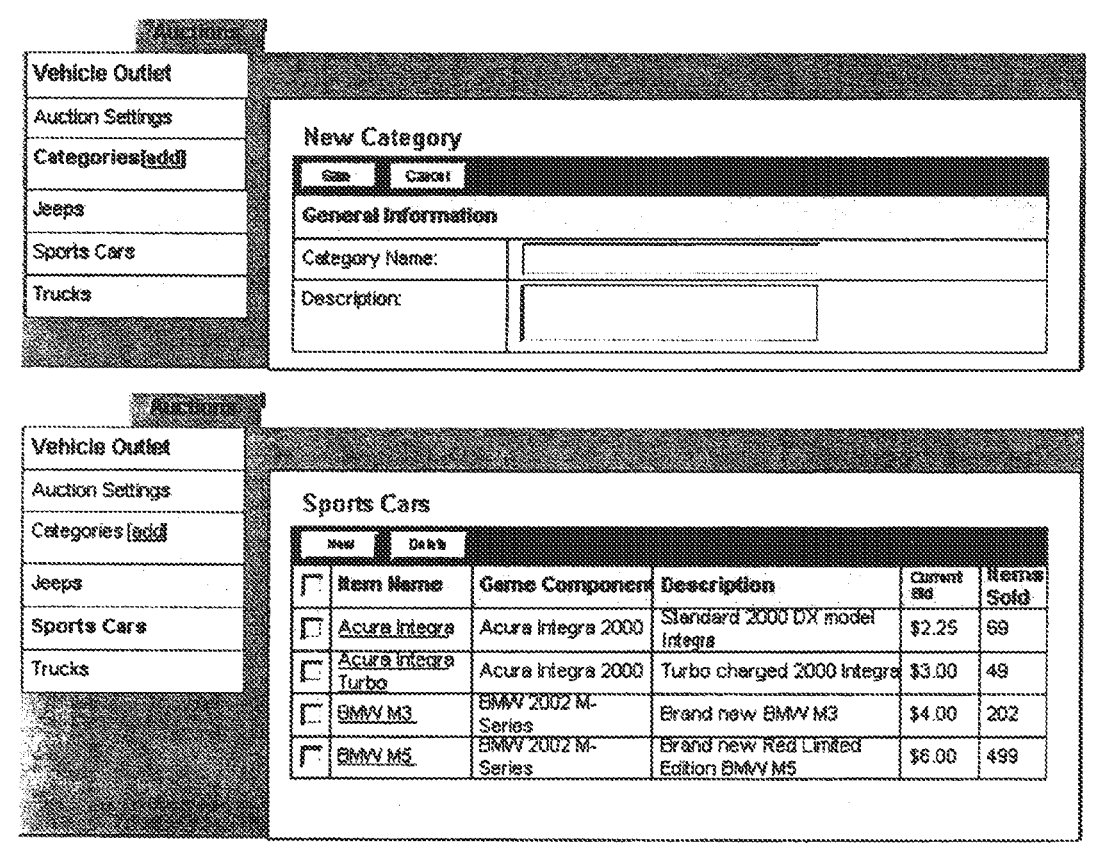

FIG. 14 is a screenshot example of how an auction catalog inventory is defined using the Commerce Manager Management Console according to an embodiment of the present invention;

FIG. 15 is a screenshot example of how provisioning rules for an auction game item is defined using the Commerce Manager Management Console according to an embodiment of the present invention;

FIG. 17 is a screenshot example of how a shopping cart of store items to be purchased are viewed according to an embodiment of the present invention;

FIG. 18 is a screenshot example of how a game store purchase is purchased and confirmed according to an embodiment of the present invention;

FIG. 20 is an example of a game player view of an auction catalog of weapons according to an embodiment of the present invention;

FIG. 24 is a screenshot example of how a game player is defined using the Game Manager Management Console according to an embodiment of the present invention;

FIG. 26 is a screenshot example of how a game player may define a user account for him/herself through the use of the game according to one embodiment of the present invention; and FIG. 27 is a screenshot example of how a game player may define a credit card that is tied to one's user account for purchases made within the game according to one embodiment of the present invention.

DETAILED DESCRIPTION

Figure 1B:
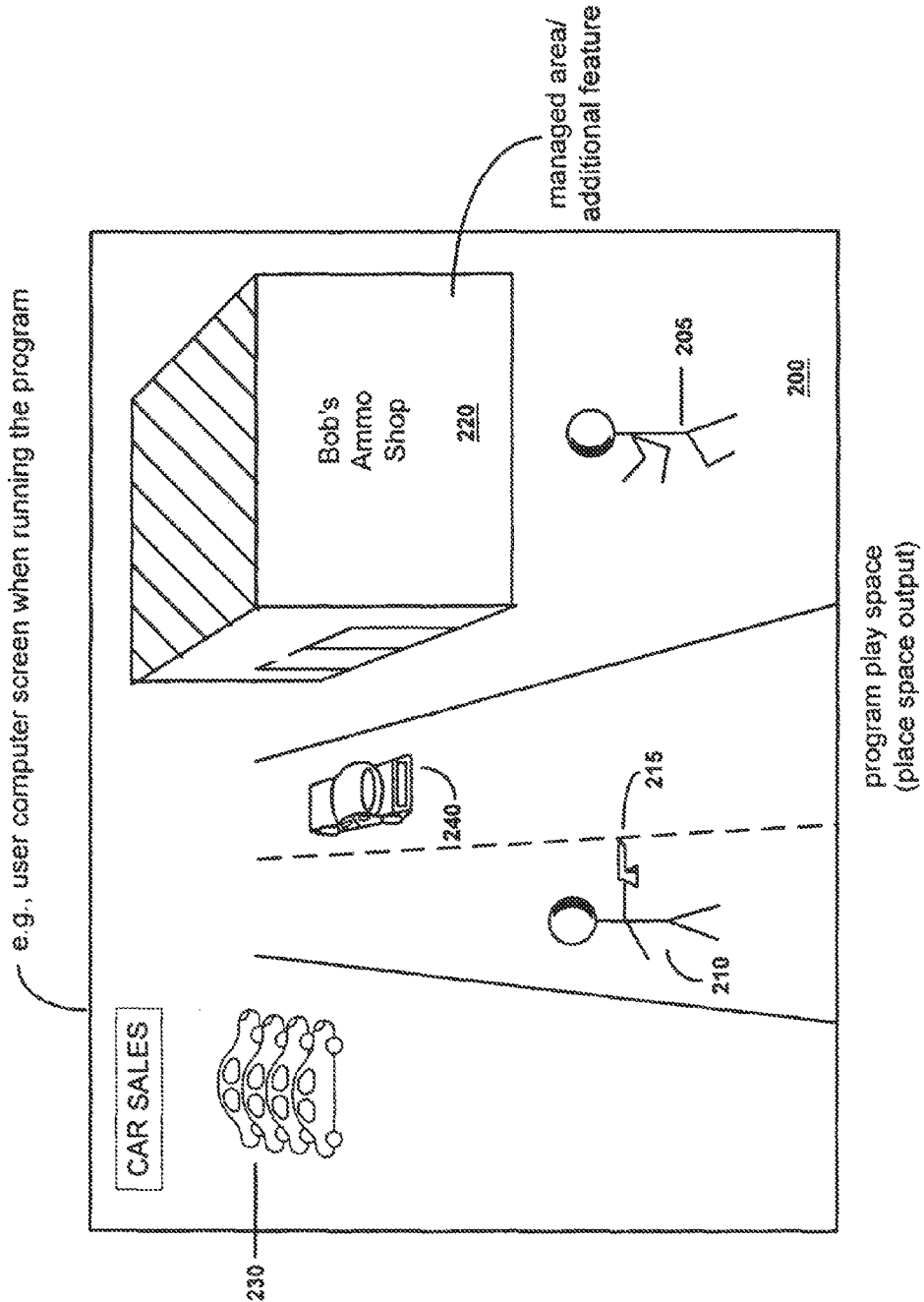
FIG. 1B is a screenshot of a program play space output according to an embodiment of the present invention.
Figure 1C:
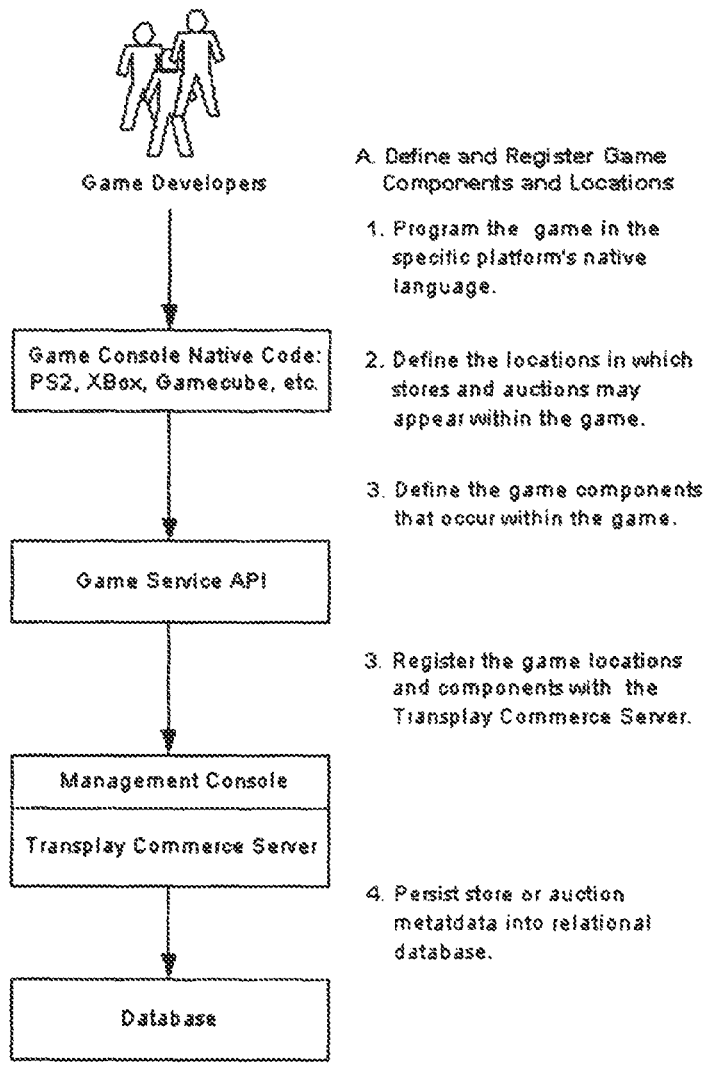
FIG. 1C is a flowchart example of how game components and locations are defined and registered according to an embodiment of the present invention.
Figure 2:
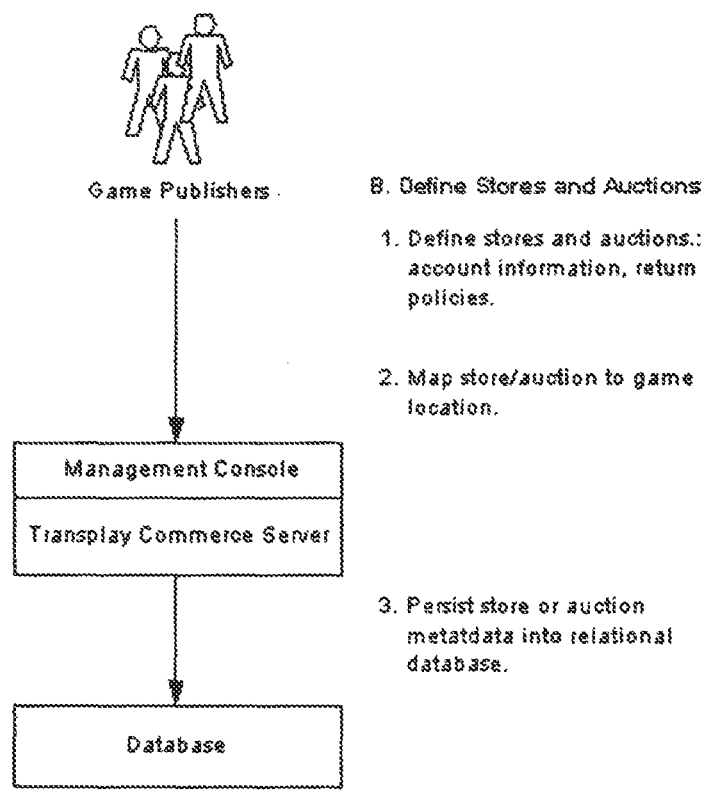
FIG. 2 is a flowchart example of how stores and auctions are defined according to an embodiment of the present invention.
Figure 3:
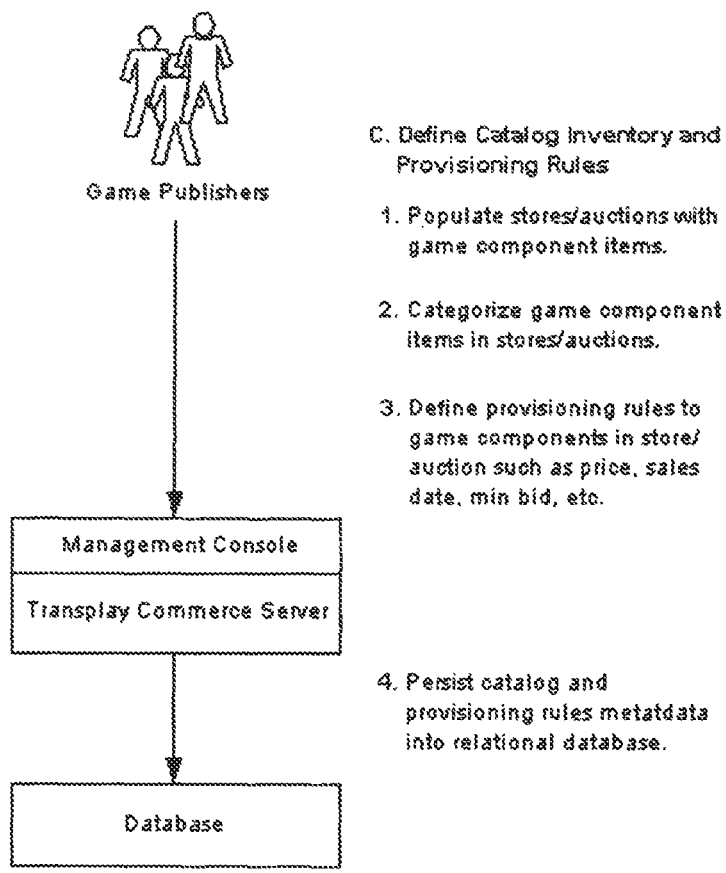
FIG. 3 is a flowchart example of how catalog inventory and provisioning rules are defined according to an embodiment of the present invention.
Figure 4:
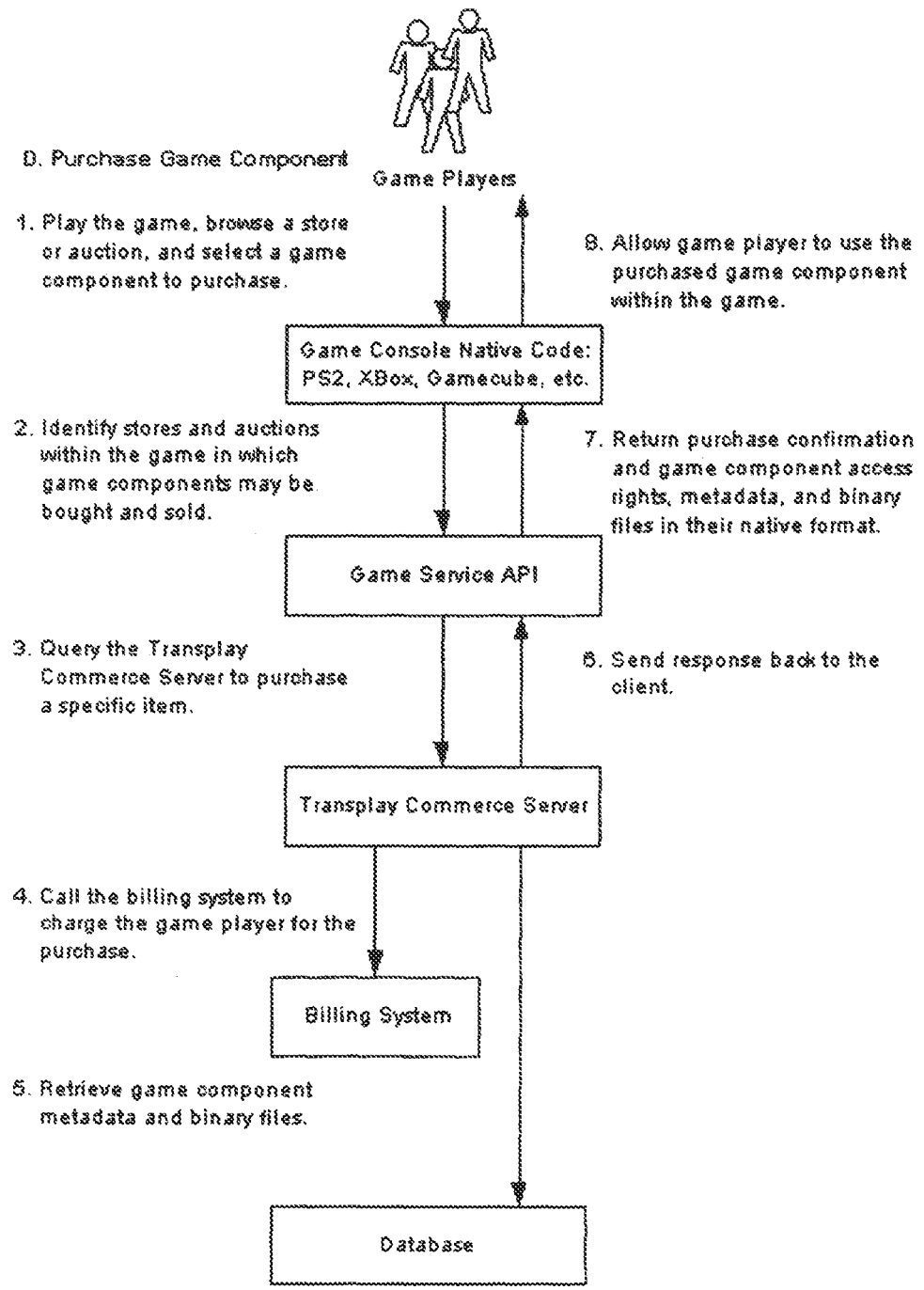
FIG. 4 is a flowchart example of how game components are purchased according to an embodiment of the present invention.

Referring now to the drawings, wherein like reference numerals designate identical or corresponding parts, and more particularly to FIG. 1A thereof, there is illustrated a drawing of a gaming system according to an embodiment of the present invention. A remote server stores an add-on component 115A that is configured to be uploaded and installed in a program 185 on a user computer 180. The program 185 includes an Application Programming Interface (API) 190 that allows the program 185 to communicate with the remote server 110 through a standard network or Internet connection hosted on the user computer 180. The add-on component 115A (initially stored in database 130 or other storage device) is, for example, served to the user computer 180 by the remote server 110 via an Internet connection, and installed in the program 185 via the API. As shown in FIG. 1A, add-on component 115A has been served to user computer 180, installed by API 190, and is shown residing within program 185 as add-on component 115B.

The add-on component is, for example, an executable program component, interpretable source code, or other software module, that, when executing within the program 185, implements a feature or otherwise adds value to the program 185. The program 185 may be any type of computer program, including any of games, business programs, entertainment programs, etc.

A publisher of program 185 releases program 185 with facilities or other hooks (programming techniques) in the program 185 that are needed to accept additional new components (e.g., game pieces, area updates, etc.). The API 190 accepts incoming new components from an Internet or other connection and provides the incoming component to the program in a manner needed by the program to accept additional programming. For example, the API saves a new component in an appropriate directory that is accessible to the program, or invokes a specific routine provided by the program to install the component.

We now turn to a specific example in which the program 185 is a game playing program of the type in which users select characters or other icons and then control movement of the selected character or icon via joystick or other input devices attached to the user computer 180. An example output play space 200 of an example "shoot em up" style game playing program is shown in FIG. 1B. The game includes characters 205 and 210 which represent users of the game. In one embodiment, the game is an on-line game, and, for example, character 205 represents a remote on-line user and character 210 represents a local user of user computer 180. Gun 215 represents a game component used by character 215 during play of the game.

In this example, the add-on component is configured to provide a virtual store, and the add-on component includes all the data and programming to place "Bob's Ammo Shop" 220 in the game. The program 185 has been programmed to have facilities to allow updates to a portion of the game playing space, and upon installation of the add-on component 115B, "Bob's Ammo Shop" appears in the game playing space. As illustrated in this example, a part of the program 185 is updated with add-on component 115B (e.g., updates programming of the game), and the programs output, or play space, is also updated with an additional feature (e.g., Bob's Ammo) provided by the add-on component.

In one embodiment, "Bob's Ammo Shop" is a virtual store that carries game weapons, and ammo that may be purchased by the local and/or remote users via interaction of their respective characters with the virtual store. Payment is made, for example, via points, health, or other value accumulated through play of the game. The characters may enter the virtual store through doors or other mean of entry provided by the add-on component and use various ways to select products from the virtual store. In one embodiment, once inside the virtual store, a virtual shopping experience is provided, with aisles, and items on shelves, etc. In another embodiment, a traditional on-line store with a pictorial index and electronic shopping cart are provided. In one embodiment, game play is suspended during "shopping." In other embodiments, game play continues while the characters shop the virtual store—thus, while walking between aisles, a player in a shoot-em-up style game may be in peril of getting shot. In one embodiment, a motif of the add-on component 115B is programmed to match a motif of the program being updated.

Typically, a virtual store within a specific game playing program will contain equipment, ammo, characters, etc that are compatible with the game playing program. Thus, upon entry of the virtual store, character 205 would be able to "purchase" his own game equipment, such as a particular model of a gun (pistol, rifle, machine gun, etc.), and character 210 may, for example, if the virtual store allows trading, trade up from a handgun to a more sophisticated weapon.

Various factors regarding each of the available game equipment. Game equipment is generally produced by the game publishers. The publishers may require certain items before equipment is provided to a user (e.g., a player must have accumulated a certain amount of points or playing time before being allowed to own a more sophisticated weapon). Such requirements are enforced via encrypted keys or other secure methods to check a users qualification before "purchase" of certain items. Such checks may be made, for example, by the remote server 110, or the program 185. Other items are available to all players willing to pay for them. Some game pieces are available for "purchase" using points, but others require purchase using currency.

Items stocked on the shelves of the virtual store may only be available in limited or fluctuating supply levels. In one embodiment, an on-line connection between the add-on component and the remote server provides up to date information on stock availability (e.g., the virtual store is an on-line store). The remote server 110 includes a manager program 120 that is configured to manage stock presented in the virtual or on-line store. The manager program 120 includes all the necessary programming to enforce game publisher rules about the sale and/or trade of gaming components (e.g., evaluation and/or production of keys needed to insure proper sale, trading, and/or use of the component), and maintains all necessary hierarchies or other organization needed to present the components available for sale or trade in an efficient manner. Messages, such as management message (M) are sent form the manager, over a network (e.g., Internet), to the user computer, through the API 190, to the add-on component 115B with the latest information needed to properly implement the feature of the add-on component (e.g., latest game components or pieces, prices and styles). Relevant information about purchases or other aspects related to activities in the virtual store (or other feature) are sent back, as needed, to the manager via response (R) messages. The manager 120 is also configured to coordinate purchases via credit card, bank accounts, or other currency sources by sending billing information to any available 3rd party credit or bill paying service (e.g., VISA, paypal, etc.).

Although only one add-on component is shown in FIG. 1A, the program 185 may be configured to accept multiple add-on components, and remote server 110 is preferably configured to serve many different types of add-on components. In addition, add-on component 115A/B is not limited to implementing a single feature in the program 185, and may also be programmed to implement multiple features. A car sales area 230 is also shown in the example game playing space of FIG. 1B. Like Bob's Ammo Shop, the car sales area is available for the selection and purchase of game equipment (cars) that can then be used in the game (e.g., car 240). In some embodiments, the update area (e.g., Bob's Ammo Shop 220) is required to have a similar motif as the program, or at least be related to the program (e.g., provide character's, equipment, etc. that is usable with or at least related to the game. However, in other embodiments, the updated area may not be related at all to the game being played. For example, instead of selling game equipment, car sales area 230 might be an actual auto dealership selling full sized automobiles. The car sales area is then, for example, and online store for Ford, Chevy, or Ferrari automobiles. In one embodiment, special gaming style programming is utilized to implement the car sales area. In another embodiment, the car sales area is a link that brings up a traditional browser into the game program that the user can view a car sales web site (the traditional browser may have a skin or other motif similar to a motif of the game program; motif of the online stores or other areas/locations within the game play space may also be similarly updated using skins developed for add-on components).

Although additional aspects and features of the invention are discussed herein below, in several broad embodiments, the present invention includes: an add-on component server from a remote server that is installed (or imported) into a program of a user computer; an add-on component that implements one or more new features to a program; a remote server that manages a part of a program remotely (e.g., notifying a virtual store in a program about stock availability), in which the part may be either an add-on component or a permanent part of the program. Management by the remote server may also be configured to insure integrity of the sale and use of the add-on components via the use of keys and other privacy facilities that make those components, or aspects of the components, inoperable unless certain conditions are met (e.g., license is fully paid).

Thus, in one embodiment, the invention is a game, comprising, a game playing program wherein at least one part of the game playing program is configured to be populated with an add-on component, and the add-on component is populated from a remote source. The add-on component may be a sales component or an on-line store.

In one embodiment, the game playing program includes a character that represents a player utilizing the game playing program, the add-on component comprises a gaming style program that implements a shopping mall paradigm, the game playing program is configured to allow the player to direct the player's representative character into the shopping mall, and the add-on component is configured to allow the character to select and purchase items in the shopping mall.

The present invention is also a system, comprising, a game playing program wherein at least one part of the game playing program (e.g., 185) is configured to be populated with an add-on component, a remote server (e.g., 110) configured to store and serve at least one add-on component (e.g., 115A) compatible with the game playing program, and an interface (e.g., 190) coupled to the game playing program, the interface being configured to interact with the remote server and facilitate importation of an add-on component from the remote server into said at least one part of the game playing program. The importation of the add-on component (e.g., 115B) may be a dynamic update (e.g., during game play) of contents of at least one of an area and location (e.g., 220) within the game playing program. The add-on component may be, for example, a game component (e.g., any of a character, scene, level, weapon, strategy, action, object, or other component) utilized by the game playing program. In another example, the add-on component may define a virtual marketplace (e.g., Bob's Ammo Shop 220) configured to at least one of trade, collect, buy, and sell game components through at least one of an online auction and store that are accessible as part of the game playing program.

In one embodiment, the remote server is further configured to register users of the system, transmit binary application code of the add-on component, and generate and transmit a license key that controls use of the add-on component.

The server includes facilities to manage an area within a program hosted on a user computer, wherein the server is remotely located from the user computer. In one embodiment, the server is further configured to define a virtual marketplace to at least one of trade, collect, buy, and sell items through any of online auctions and stores that have been dynamically updated into the program.

The server may also be further configured to facilitate fulfillment of purchase transactions incurred by a game player in a virtual store of the managed area, and bill the game player's purchases via interaction with a third party billing system to charge the game player and credit a selling party, and, for example, persist a billing record of fulfilled purchase transactions by saving relevant purchase information into a centralized storage device (e.g., to database 130).

The server may also be configured to identify areas within the program that are capable of being dynamically updated from a remote source and then dynamically update the content of at least one of the identified areas, and, for example, the identified areas comprise at least one of a two dimensional and three dimensional space within an output of the game program.

Figure 25:
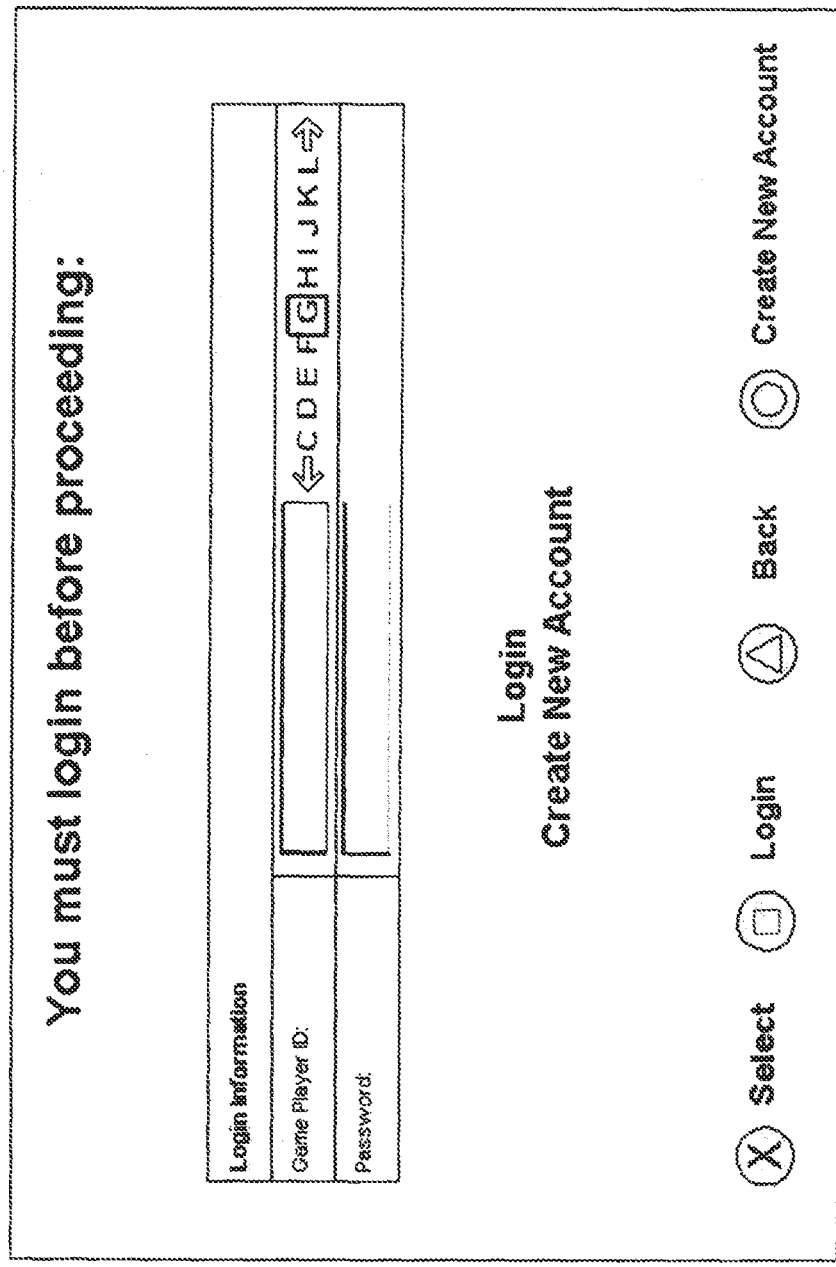
FIG. 25 is a screenshot example of how a game player is prompted with a login screen when attempting to view a secured or personal area such as his/her auction list, shopping cart, checkout screen, or owned items according to an embodiment of the present invention.

On-line commerce includes a method, comprising the steps of, uploading an add-on component to a game program of the registered user, wherein the game program is configured to accept and install the add-on component, and managing activities of the user during interactions of the user with the uploaded add-on component. Preferably, the users are required to login to the system as shown in FIG. 25 and are registered with the system which includes, for example, ID information, and credit or other information used to bill the user for services and/or products offered by any one or more features provided by the present invention. Illustrative examples are shown in FIG. 24, and FIGS. 26 and 27. Managing activities includes, for example, managing shopping carts, managing display of items for sale or auction, and managing a hierarchical organization items for sale or auction. Managing also includes the steps of defining a set of guidelines governing a game component's sale, purchase, trade, collection, display, distribution, or behavior, and enforcing the guidelines through the step of managing activities, including any respective metadata, binary files, and license keys of the add-on component according to the set of guidelines governing the uploaded component (e.g., as provided by game publishers).

The invention also includes a method of producing add-on components for games, comprising, preparing an executable program component capable of being imported into a game program and configured to interact with a game being played by a user of the game program. The executable program component may be programmed or otherwise configured to implement a virtual store in which game players may participate by purchasing items offered for sale, and, for example to continue game play action of the game program in the virtual store.

An API (e.g., 190) is utilized that allows the program (e.g., a game) to dynamically update the contents of an area/location within the program from a remote source. This is particularly applicable to "commerce" intended to take place, for example, in a game, such that the "area/location" being updated is a store or an auction and the "contents" are game objects, items, equipment, characters, etc that are for sale. "Bob's Ammo Shop" 200, discussed previously, is one example, other examples include an FTD florist for sending virtual flowers to other game players in an on-line community (or outside the community). In another example, the FTD florist is an actual flower shop that accepts orders from game players, the real flowers are then delivered to street addresses worldwide.

The "area/location" may also be a feature that is a non-commerce scenario as well. For example, an "area/location" may also be defined in the game as a treasure chest and the "contents" of the treasure chest may be coins, jewels, weapons, potions, etc. In one embodiment, the contents are dynamically determined by making a request (or response to a remote server management message) to a remote server that manages and maintains the catalog of items. Furthermore the "remote server," on a Transplay Platform (e.g., 105), may execute code at the time of the request to determine what specific item should display within the treasure chest depending upon "game rules" that are set up as an administrative process by the game developer or publisher through, for example, a web based management console. Examples of such rules are show jewels if the main character opening the chest is a woman, show life potion if the main character's health is less than 50%, or randomly etc. Another example of this behavior is defining a building as a location within a game (e.g., an ammo shop, museum, gas station, fast food, etc.), different bad guys that run out of the building shooting at the main character as the content, and game rules such as run out only if the main character has rescued the President and is at risk of escaping. Any game rules for any particular game or group of games may be utilized.

We now provide a more detailed look at the various feature of the present invention. In one embodiment, the present invention provides an online game commerce system that provides game developers and publishers with the ability to define, sell, distribute, and manage "game components" such as but not limited to characters, scenes, levels, weapons, strategies, actions, and objects. For example, game developers define a virtual marketplace where game players may interact with each other to trade, collect, buy, and sell their game characters, scenes, and components through online auctions and stores that become part of the gaming experience. Through the use of Web based management consoles, game publishers are allowed the flexibility to manage the pricing and distribution of game assets per download, per transaction, or on a subscription basis.

For example, consider the case in which a game player has invested significant time practicing and playing an online NFL football game. During the course of his game play, he has built a successful football franchise and has won five consecutive NFL titles with several star players that he has acquired and trained over time. The competition is getting a bit boring and he is ready for a new challenge, and therefore decides to sell his football team on the open market through an online auction. This online auction of video game characters is depicted within the video game as each of the game player's football team player's contracts expiring and deciding to become free agents. The virtual game sequence of the football player entering the open market as a free agent and signing a contract with a new team is actually conducted as a live transaction between two real game players where the original team owner is paid real money for the negotiated price of the virtual game character.

In another example, take the case in which a game enthusiast purchases an online race car game at a retail store that comes with five different starter cars. Once connected at home, the game player is offered the opportunity to purchase additional cars online for $5 each or a new engine for existing cars for $1.00 each. A month later after the initial release of the game, new cars and race tracks are downloadable for a price of $5.00 each or a promotional offer of $20 for any combination of five.

Figure 5:
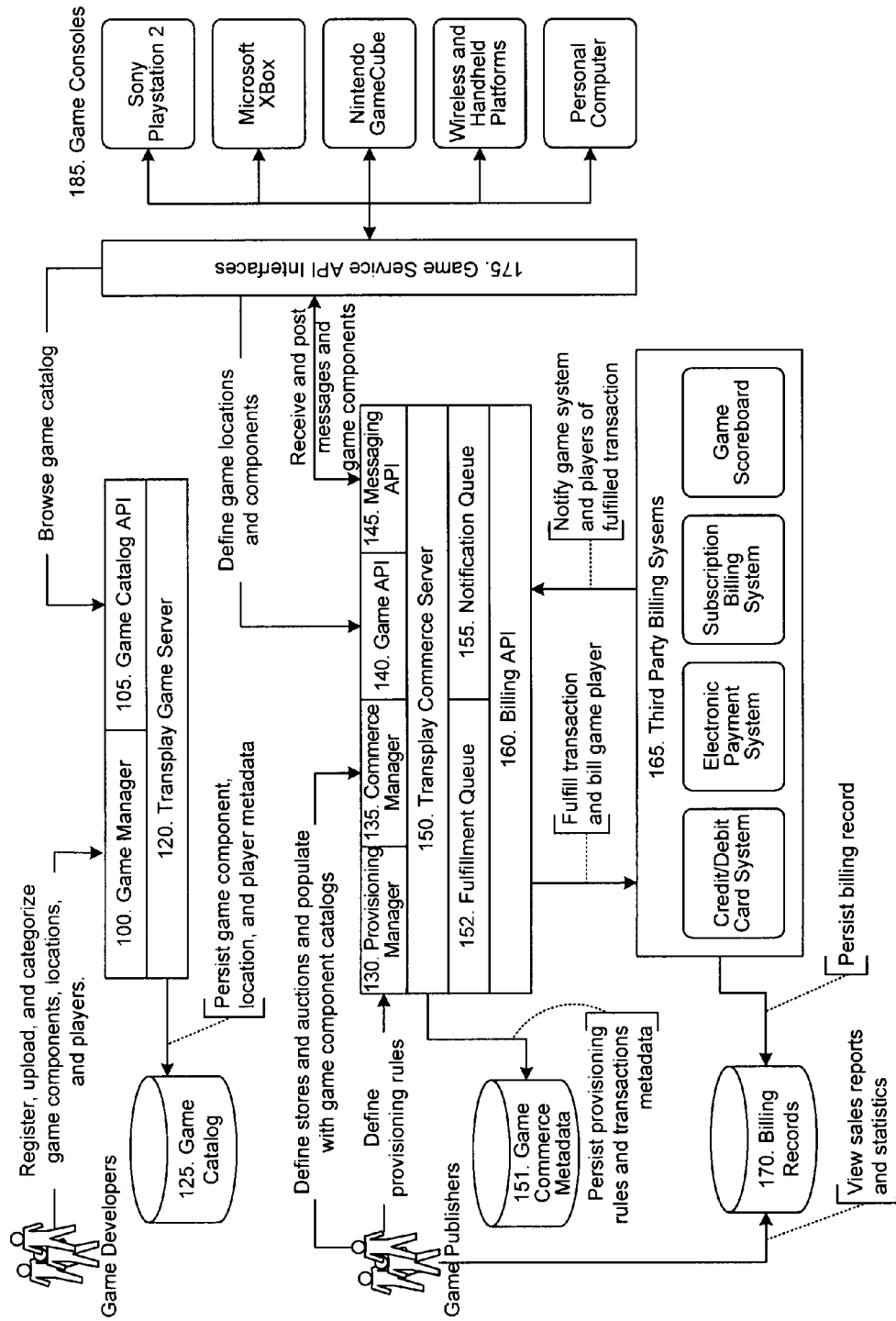
FIG. 5 is a block diagram example of the online commerce system according to an embodiment of the present invention.

Register, upload, and categorize game components: In one embodiment, the present invention provides a method for registering, uploading, and categorizing game components such as characters, weapons, objects, scenes, levels, strategies, or actions. In this context, the terms "registering" and "uploading" refer to a unique process for defining the properties of a game component, transmitting the binary application code that represents such game component onto a remote game server, and generating a unique license key code that unlocks the use of a specific instance of a game component through the use of a user interface or an automated asynchronous system. "Categorizing" refers to a method of classifying or organizing registered game components into a hierarchical grouping by their specific properties such as but not limited to its skill set, color, dimensions, level, edition, version, price, rarity, age, and relationships to other game components. In one embodiment, the act of registering, uploading, and categorizing game components is fulfilled as shown in FIG. 5, item 100 through the use of a Web based management console as illustrated in FIG. 8.

Figure 9:
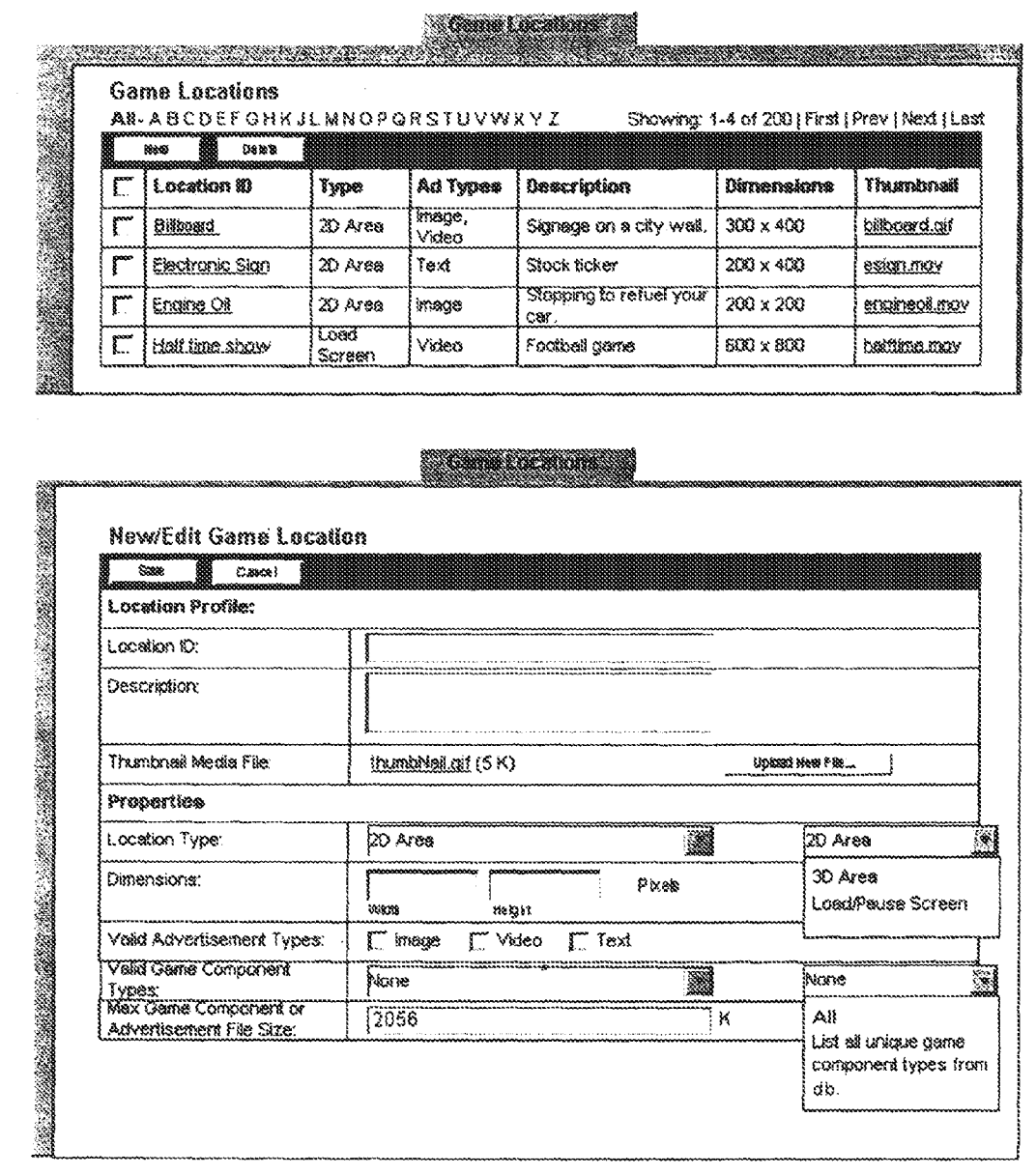

Define and register game locations: In one embodiment, the present invention provides a method for defining and registering game locations. A game "location" in this context is defined as any two or three-dimensional area within a game whose contents may be dynamically updated, changed, or retrieved from a remote source. In one embodiment a game location may be defined as a store or auction and the "contents" being updated are game objects, items, equipment, characters, etc that are for sale. In another embodiment, a game location may be defined in a game as a treasure chest and the contents of the treasure chest being updated may be coins, jewels, weapons, potions, etc and may be dynamically determined by making a request to a remote server that manages and maintains the catalog of items. In one embodiment, the act of defining a game location is achieved through the use of a Game and Game Service API as shown in FIG. 5, Items 140 and 175 and the act of registering a game location is achieved through the use of a web based management console as illustrated in FIG. 5, Item 100 and FIG. 9.

Define and register game players: In one embodiment the present invention provides a method for defining and registering game players. A "game player" in this context may be defined as any person directing the control of a game character, component, or object within a game. Types of information associated with a game player that may be registered with the system include but are not limited to account identification information such as a game player id/username and password, personal contact information such as home address, email address, phone number, etc, and billing information such as credit card account, expiration, or preferred billing preferences. In one embodiment, an administrative user may register a game player through the use of a web based management console such as that depicted in FIG. 24. In another embodiment, the game player may register him/herself with the system through a set of user interface screens that are part of the game itself as depicted in FIGS. 26 and 27.

Authenticate and authorize game players: In one embodiment the present invention provides a method for authenticating and authorizing a game player within the game system. "Authenticating" in this context may be defined as the act of ensuring the identity of a game player by comparing the combination of a game player id and password with an existing account already present within the game system. This is achieved through the use of an in game screen such as that depicted in FIG. 25. "Authorizing" in this context may be defined in one embodiment as the act of determining whether an authenticated game player has the appropriate permissions to view a protected area within a game and download and execute protected game components. For example, in FIG. 1B, both the local and remote game players controlling game characters 210 and 205 maintain their own unique authorization permissions to game components such as guns and cars. For example, game player 205 may have access to a Colt 45, a hand grenade, and a Uzi machine gun, while game player 215 may have access to a 38 special, rocket launcher, and a Ford Mustang get-away car. Each game player may modify his/her access rights to additional game components by purchasing or collecting additional rights through the game commerce system described by the present invention. The authentication and authorization metadata of a game player that determines a game player's rights and restrictions to game components within the system in one embodiment are stored by a Game server (FIG. 5, Item 120) within a relational database or networked file system (FIG. 1A, Item 130, or FIG. 5, Item 125).

Figure 23:
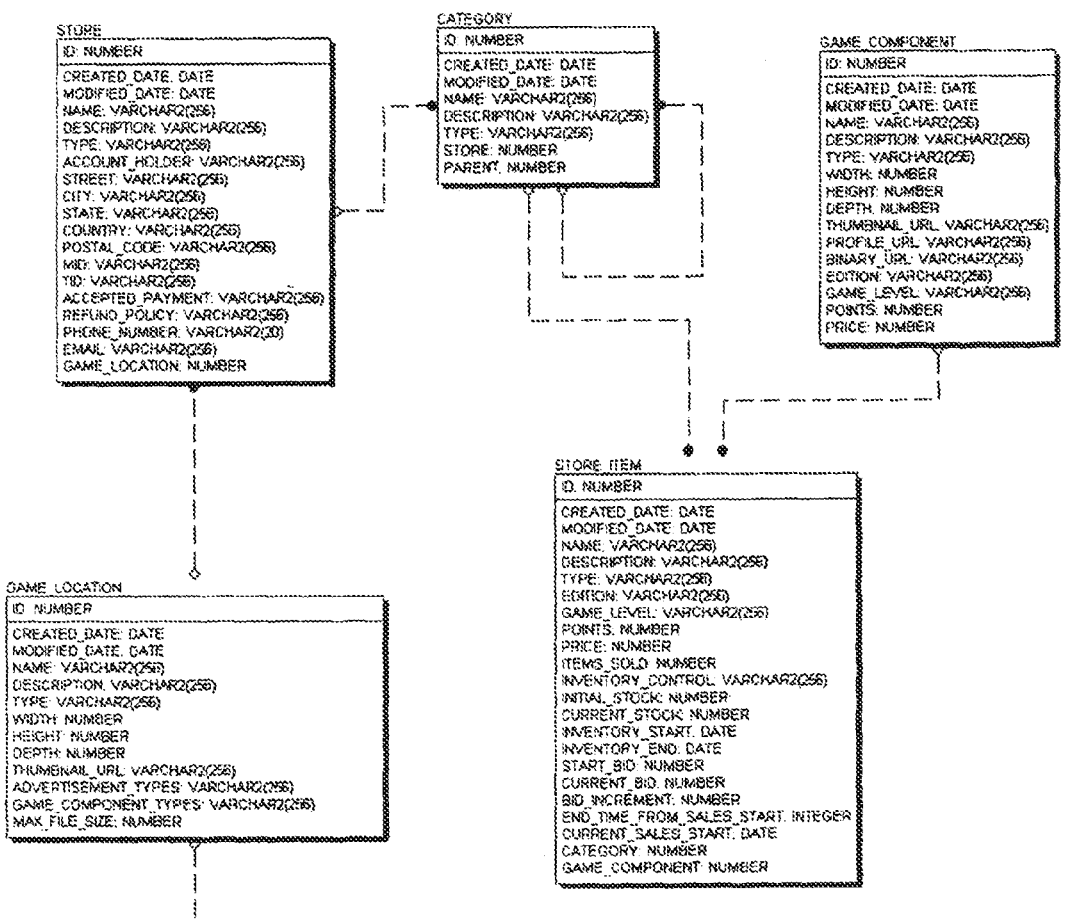
FIG. 23 is a relational database schema for metadata storage according to an embodiment of the present invention.

Persist game component and location metadata: In one embodiment, the present invention provides a method for persisting game component and location metadata into a centralized storage device such as a relational database catalog or networked file system. In this context, the term "metadata" refers to any describing property or feature of a game component or location defined during registration of the game component or location into the game server system. Examples of such properties include but are not limited to: name, description, game component type, color, categories, genre, dimensions, weight, speed, strength, health, weaknesses, relationships, weapons, price, age, rarity, etc. The act of persisting game component and location metadata is achieved, in one embodiment, through a Game Server such as one depicted in FIG. 5, item 120 receiving user input from a Web based management console (FIG. 5, Item 100 and FIG. 9) and saving them to relational database as shown in FIG. 5, item 125. In one embodiment, the specific structure of the data within the relational database may be stored in tables such as those depicted in FIG. 23.

Define provisioning rules: In one embodiment, the present invention provides a method for defining provisioning rules for an individual game component or a grouping or category of game components. In one embodiment, "provisioning rules" refers to a set of guidelines that govern the dynamic display or behavior within a game location. In the scenario in which a treasure chest is defined as a game location' and the contents of the treasure chest are dynamically retrieved from a remote server and may be game items such as jewels, coins, weapons, etc, examples of provisioning rules that are determined by the server are "show jewels if the main character opening the chest is a woman," "show life potion, if the main character's health is below 50%," or "show demons if the main character has previously opened the chest." In another embodiment, the term "provisioning rule" refers to a set of guidelines governing a game components sale or purchase. Examples of such guidelines include but are not limited to the ability to define a game component or group of components for sale through an online auction and/or an online store, the ability to set maximum and minimum sale prices, the ability to define an inventory of available game components to be sold by any auction or store, the ability to limit the number of game component items sold by a given store or auction as a fixed numerical limit or a percentage of available inventory, the ability to define weighted discounts for multiple purchases of related or bulk purchases, and the ability to define subscription bundles of game component offerings and updates. Moreover, "provisioning rules" may refer to a set of guidelines that are based upon the specific game environment variables that determine game players' ability to purchase, trade, collect, and/or sell specified game components. Examples of such game environment variables include but are not limited to the skill set, level, points, experience or other identifying characteristics of a game player or of the game objects and characters that a game player owns, and past actions taken against different game objects or characters performed by the game player or through characters or objects that the game player controls and owns. The act of defining provisioning rules is achieved, in one embodiment, through the use of a Web based management console as shown in FIG. 5, Item 130 and FIGS. 12 and 15.

Figure 7A:
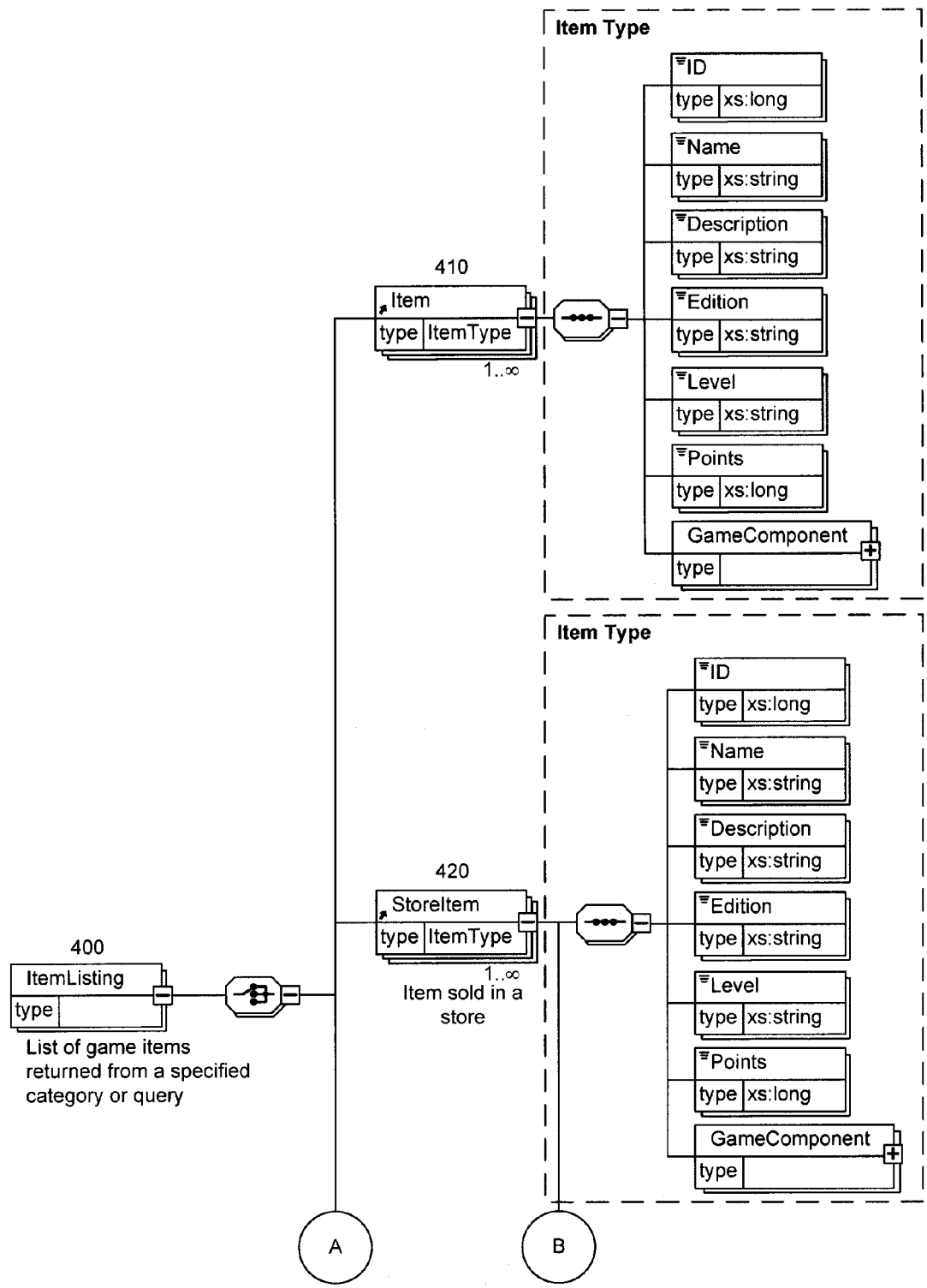
FIGS. 7A and 7B are a schematic example of a game item data structure according to an embodiment of the present invention.
Figure 7B:
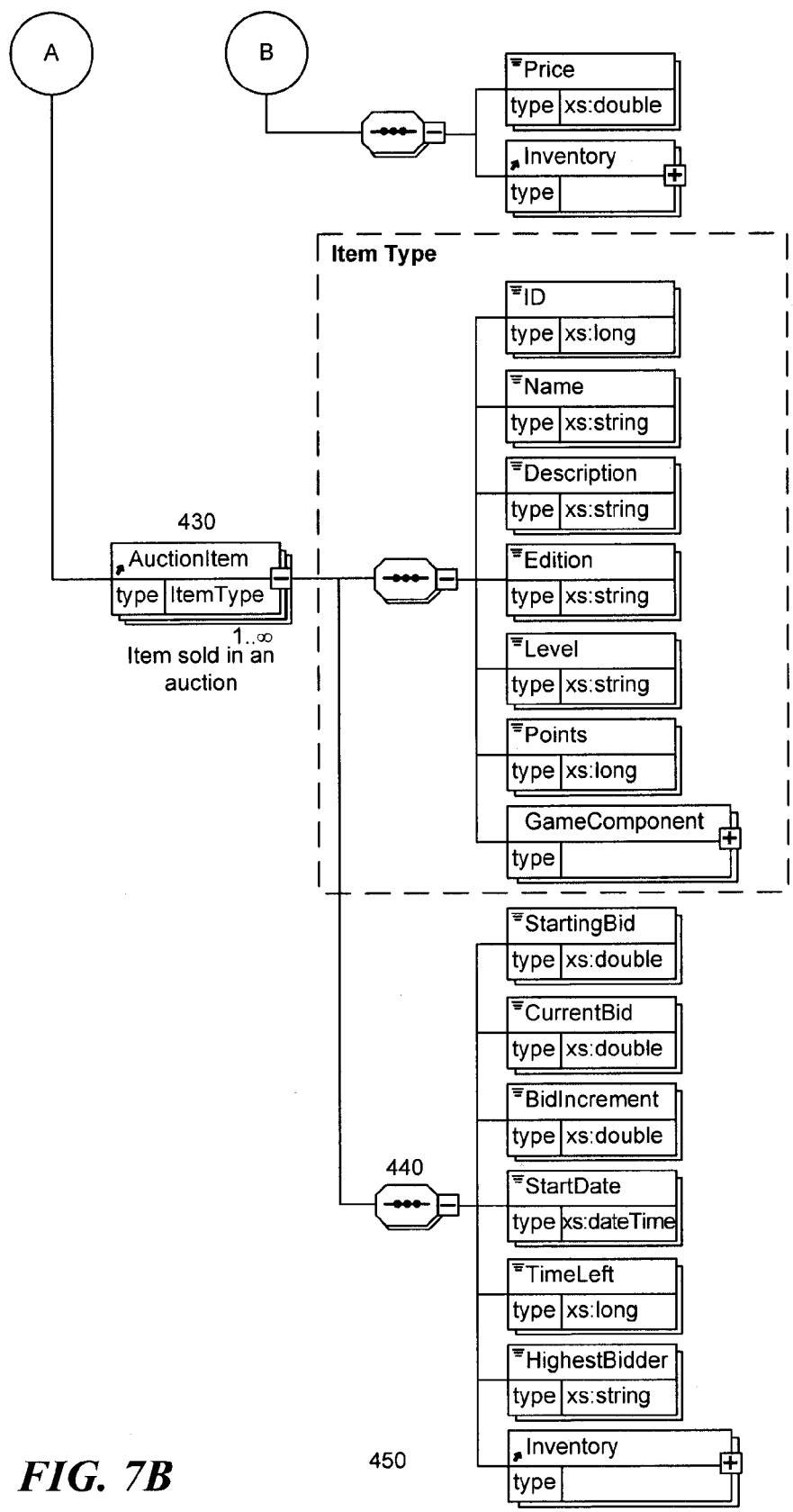
Figure 16:
FIG. 16 is a screenshot example of how a game store catalog from a game is viewed according to an embodiment of the present invention.
Figure 19:
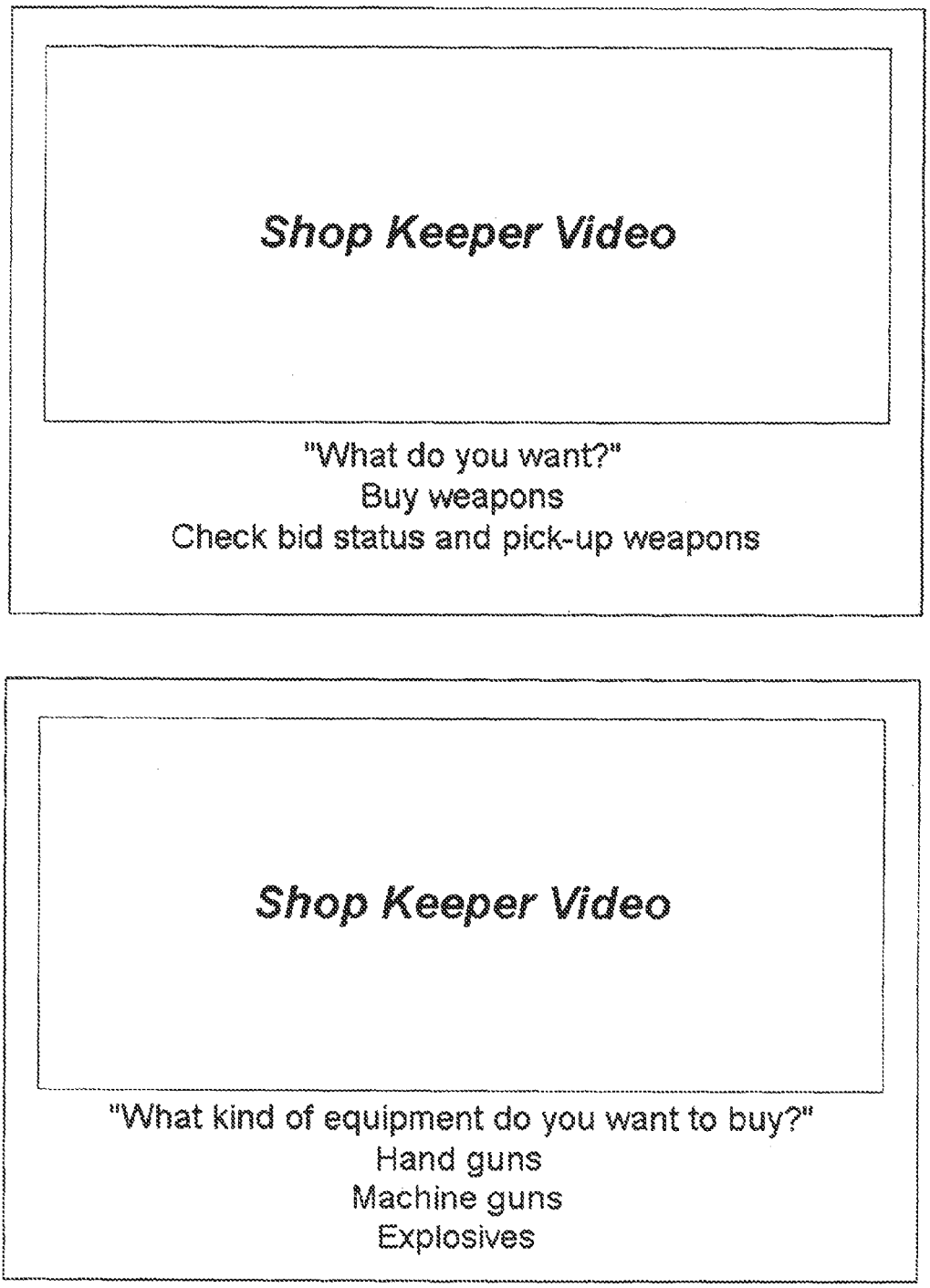
FIG. 19 is an example of an in game video sequence of a shop character asking the game player what equipment the player wants to purchase through an online auction according to an embodiment of the present invention.
Figure 20:
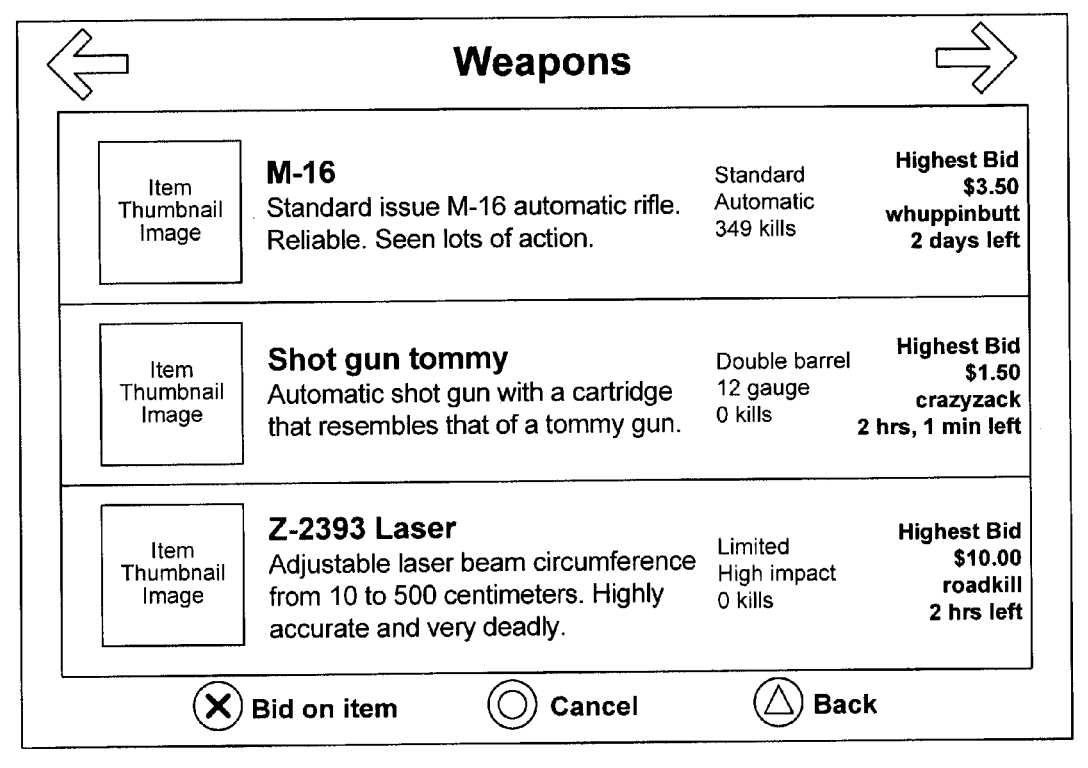
Figure 21:
FIG. 21 is a screenshot of a game player bidding on an auction item according to an embodiment of the present invention.

Browse game catalog: In one embodiment, the present invention provides a unique method for game developers to allow game players to navigate through or search a hierarchical grouping of game components and view the metadata associated with each game component and category. Specifically a grouping of game components may be organized according to the specific properties such as but not limited to skill set, color, dimensions, level, edition, version, price, rarity, age, and relationships to other game components. In one embodiment browsing a catalog of game components may be represented as navigating through a set of two-dimensional screens that list out the game components within each catalog such as depicted in FIGS. 16 and 20. In another embodiment, browsing a catalog may be represented as cinematic or three-dimensional animated sequences or interactions between game characters or objects in which a game player navigates a game character through different aisles within a store and browses the shelves for specific game components and items such as depicted in FIG. 19. This is achieved through the use of a Game Catalog API (Application Programming Interface), such as depicted in FIG. 5, item 115, that provides a standard programming interface to browse the game catalog from any proprietary gaming console or client such as, but not limited to, Sony Playstation 2, Microsoft Xbox, Nintendo GameCube, any wireless or handheld game client, or a personal computer. In one embodiment, when the game console client requests a list of game items from the Game Catalog API (FIG. 5, item 115), a serialized data structure such as that depicted in FIGS. 6 and 7 is returned by the Game Server (FIG. 5, Item 120).

Figure 17:
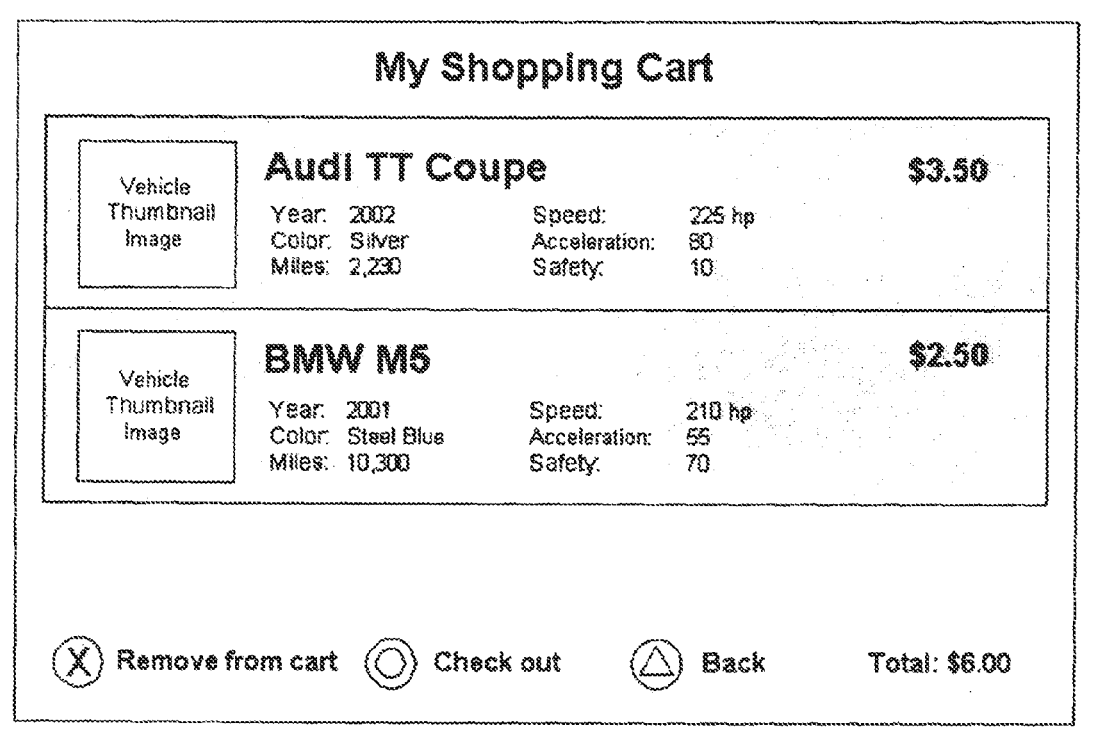

Define and participate in a store: In one embodiment, the present invention provides a unique method for game developers to define a virtual store in which game players may participate by purchasing items for sale by the game publisher or other game players or by posting their own game components to sell to other game players. The act of purchasing the game components may in one embodiment be represented as navigating through a set of two dimensional screens, such as those depicted in FIGS. 16, 17, and 18, adding game component items to one's purchase list or "shopping cart" and then "checking out" to pay for the items as a single credit card transaction. In another embodiment, the act of purchasing game components may be represented as a set of cinematic sequences or animated 3D game characters, objects, and models that virtually select the items to purchase from a store shelf, carry the items to the checkout counter, wait in line for the next available clerk, and interact with the store clerk to purchase the game items. This is achieved through the use of Game and Game Service APIs (Application Programming Interface), as shown in FIG. 5, items 140 and 175, that provide a standard programming interface to create a store, define the contents of a store, browse a store's content, post an item for sale within a store, and purchase and remove an item from a store from any proprietary gaming console or client such as, but not limited to, Sony Playstation 2, Microsoft Xbox, Nintendo GameCube, any wireless or handheld game client, or a personal computer.

Figure 22:
FIG. 22 is a screenshot of a game player's auction bid list, notifying the game player of the auctions that he/she has won according to an embodiment of the present invention.

Define and participate in an auction: In one embodiment, the present invention provides a unique method for game developers to define a virtual auction in which game players may participate by bidding and purchasing items for sale by the game publisher or other game players or by posting their own game components to sell to other players. The act of bidding on and purchasing game components may in one embodiment be represented as navigating through a set of two dimensional screens, such as those depicted in FIGS. 20, 22, and 23 adding game component items to one's bid list and then placing a maximum bid amount to purchase the item through the use of a credit card. In another embodiment, the act of bidding on game components may be represented as a set of cinematic sequences or animated 3D game characters, objects, and models, such as those represented in FIG. 20, that represent a virtual auction house in which an auctioneer calls on auction participants that raise their hands to signal a new bid. This is achieved through the use of Game and Game Service APIs (Application Programming Interface), as shown in FIG. 5, items 140 and 175, that provides a standard programming interface to create an auction, define the contents of an auction, browse an auction's content, post an item for sale within an auction, set a bid increment, minimum bid amount, and closing amount for an auction, create an automatic bid notification alert or automatic bid increase for items that one is actively bidding, and purchase and remove an item from an auction from any proprietary gaming console or client such as, but not limited to, Sony Playstation 2, Microsoft Xbox, Nintendo GameCube, any wireless or handheld game client, or a personal computer.

Persist provisioning rules and transactions metadata: In one embodiment, the present invention provides a unique method for persisting provisioning rules and transactions metadata into a centralized storage device such as a relational database or networked file system. In this context, "provisioning rules" refers to a set of guidelines determined by a game publisher governing a game component's sale or purchase or dynamic display within a game location as defined by paragraph 17. "Transactions metadata" refers to the properties and actions defined by game players when defining and participating in a store or auction as described in paragraphs 19 and 20. The act of persisting provisioning rules and transactions metadata is achieved, in one embodiment, through a Commerce Server such as one depicted in FIG. 5, item 150 receiving user input from a Web based management console (FIG. 5, item 130, FIG. 12, FIG. 15) or game player user interface screens (FIGS. 16-23) and saving them to relational database as shown in FIG. 5, item 151. Moreover, the structure of such provisioning rules may in one embodiment may be represented and saved as an XML document as represented by FIG. 6, items 330 and 340, and FIG. 7, items 430 and 440.

Fulfill transaction and bill game player: In one embodiment, the present invention provides a unique method for fulfilling purchase transactions and billing a game player. When the game commerce server receives a purchase order from an invocation of a purchase action from the Game and Game Service APIs (FIG. 5, items 140 and 175) by a game system client, the purchase order request is placed into a fulfillment queue such as that depicted in FIG. 5, item 152. An asynchronous process cycles through orders within the fulfillment queue and attempts to charge the buying game player's account and credit the selling game publisher's or player's account by invoking the methods and objects provided through a standard Billing API such as that represented in FIG. 5, item 160. Specific implementations of the Billing API interfaces are depicted in FIG. 5, item 165 and may include but are not limited to credit and debit card processing systems, electronic payment systems such as PayPal and direct deposit, subscription based billing systems, and a game scoreboard system in which game items are exchanged for game points or credits that are acquired during game play.

Persist billing record: In one embodiment, the present invention provides a unique method for persisting the billing record of the fulfilled transaction into a centralized storage device such as a relational database or networked file system. Information such as, but not limited to, the user names of the participating buyer and seller, the current time and date, the sale price, starting bid price, total number of bids, length of auction or total time to sell the item, units sold, is saved as part of the transaction. The act of persisting a billing record is achieved in one embodiment as depicted in FIG. 5 in which a Billing System (item 165) saves the record into a relational database (item 170).

Notify game system and players of fulfilled transaction: In one embodiment, the present invention provides a unique method for notifying the game system and participating game players of fulfilled transactions. As depicted in FIG. 5, after a purchase order is fulfilled, through invoking a standard notification interface provided by a Billing API (item 160), a third party billing system (item 165) sends a fulfilled purchase order message to the game system which places the message into a notification queue (item 155). The game commerce system server (item 150) then processes the notification messages asynchronously. If a transaction failed due to insufficient funds or an inability to charge the buying player or credit the selling game publisher or player, then both the buying and selling parties are notified and the auction or store sale continues for future consideration. If a transaction has been successfully fulfilled, then both buying and selling parties are notified and for auction sales, the game system closes the specified auction and notifies all participating players of its end, or for store sales, removes the sold item from the store and decrements the store's inventory appropriately. In one embodiment, such notification may be represented as a two dimensional dialog box or screen that pops up within the game or changes state such as that depicted in FIG. 22 and in another embodiment may be represented as the presence of or change in behavior or appearance of a specific game object, character, or location or by a specific game character explicitly notifying or telling the game player's main character as part of the game play and in another embodiment may be represented as an email message that is sent to the game player outside the immediate context of the game.

Receive and post messages and game components: In one embodiment, the present invention provides a unique method for receiving and posting messages and game components. As depicted in FIG. 5, when a successful transaction has been fulfilled both selling and buying parties are notified via a message sent by invoking a standard Messaging API interface (item 145) provided by the game commerce server (item 150). The game commerce server sends a message to the game clients of game players who have sold a game component to upload the sold game component and/or the specific license key unlocking the use of the game component onto the game server and instructs the game clients of game players who have purchased the game component to download the purchased game component and/or license key from the game server. Any metadata associated with the purchased game component is also transferred to the new owner. Examples of the structure of such metadata are illustrated in FIGS. 6 and 7. The embodiment described above describes a centralized method for receiving and posting messages and game components through the use of a server to broker message and component transfers. However, in another embodiment, the present invention provides a unique method for receiving and posting messages and game components through a peer-to-peer network or distributed system in which game clients connect directly to each other to exchange messages and components.

View sales reports and statistics: In one embodiment, the present invention provides a unique method for viewing sales reports and statistics about fulfilled transactions. Through the use of a user interface such as a web based application, game publishers or system administrators may review reports that illustrate transaction details such as but not limited to game component sales by time period, store and auction inventories over time, and game component sales by demographic group or region or game component properties such as skill set, color, dimensions, level, edition, version, price, rarity, age, and relationships to other game components.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Data used by the software may be retrieved from different sources (local or remote) and either permanently or temporarily stored (before, during, or after any processing) by utilizing any of text files, delimited files, database(s), or other storage techniques. Ultimately, such computer readable media further includes software for performing the present invention, as described above.

Included in the programming (software) of the general/specialized computer or microprocessor are software modules for implementing the teachings of the present invention, including, but not limited to, finding updateable areas of a program, transferring components from a remote server to a program, managing areas/locations with a remote program, including organizing displays and facilitating purchase of items displayed, installing add-on components into a program, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

We claim:

1. A method in an on-line commerce server, having a processor, the method comprising:
    receiving a request from a remote gaming system, the remote gaming system comprising a game program playable by a user;
    in response to receiving the request, identifying, with the processor, an area within the game program capable of being dynamically updated with an add-on component; and
    providing an add-on component to the remote gaming system, wherein the game program is configured to install the provided add-on component so that the user can interact with the provided add-on component while playing the game program.

2. The method of claim 1 wherein the provided add-on component is an online store.

3. The method of claim 2, further comprising:
    after the provided add-on component has been installed, allowing the user, while interacting with the provided add-on component, to purchase a new game component for the game program, wherein the new game component is configured to be used by a character of the game program.

4. The method of claim 3 wherein the online store permits points accumulated during play of the game program for payment of game components selected for purchase through the provided add-on component.

5. The method of claim 3 wherein the new game component is a piece of equipment configured to be equipped by a character of the game program.

6. The method of claim 2, further comprising:
    after the provided add-on component has been installed, allowing the user, while interacting with the provided add-on component, to purchase a new game component for the game program, wherein the new game component is at least one of a scene, level, strategy, or action.

7. A system comprising a memory and a processor and further comprising:
- a module configured to register a user of a gaming system;
- a module configured to upload an add-on component to a game program associated with the registered user, wherein the game program is configured to install the add-on component; and
- a module configured to manage activities of the user as the user interacts with the uploaded add-on component
- wherein at least one of the modules comprises computer-executable instructions stored in memory for execution by the processor.

8. The system of claim 7, wherein the add-on component comprises at least one of an on-line store and an online auction accessible by the user for the exchange of game components.

9. The system of claim 7, further comprising:
- a module configured to enforce guidelines governing the exchange of a game component.

10. The system of claim 9, further comprising:
- a module configured to facilitate a purchase of a second game component by allowing a purchasing user to download the second game component along with its respective metadata, binary files, and license keys according to the guidelines governing the second game component.

11. The system of claim 7 wherein the game component is a level achieved by a game player playing the game program.

12. The system of claim 7, further comprising:
- a module configured to prepare sales reports and statistics about fulfilled game component exchanges.

13. The system of claim 7, further comprising:
- a module configured to send a notification message to a buyer and a seller for each fulfilled game component exchange.

14. A computer-readable storage device storing instructions that, when executed by a computing system comprising game components configured to be used by characters within a game program, cause the computing system to perform operations comprising:
- sending to an online commerce server a request for an update to a dynamically updateable add-on component of the game program; and
- receiving from the online commerce server an add-on component of the game program, wherein the game program is configured to install the received add-on component so that a user can interact with the received add-on component while playing the game program.

15. The computer-readable storage device of claim 14, the operations further comprising:
- facilitating the purchase, by the user while interacting with the installed add-on component, of a new game program component configured to be used by a character of the game program.

16. The computer-readable storage device of claim 14 wherein the received add-on component is an auction component, the operations further comprising:
- populating the received add-on component with a plurality of game component items.

17. The computer-readable storage device of claim 14, the operations further comprising:
- categorizing the plurality of game component items; and
- defining provisioning rules for each of the plurality of game component items.

18. The computer-readable storage device of claim 14 wherein the provisioning rules for at least one of the game component items specifies a starting bid price, a current bid price, a bid increment value, a start date, and a duration.

19. The computer-readable storage device of claim 14 wherein the plurality of game component items comprise at least one achievement obtained by playing the game program.

20. The computer-readable storage device of claim 14, the operations further comprising:
- enforcing guidelines governing the exchange of a game component.

* * * * *